(12) United States Patent
Bogineni et al.

(10) Patent No.: US 11,792,723 B2
(45) Date of Patent: *Oct. 17, 2023

(54) RAN-CORE PAIRING SERVICE

(71) Applicant: Verizon Patent and Licensing Inc., Basking Ridge, NJ (US)

(72) Inventors: Kalyani Bogineni, Hillsborough, NJ (US); Ratul K. Guha, Kendall Park, NJ (US); Jignesh S. Panchal, Hillsborough, NJ (US); Niranjan B. Avula, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/187,127

(22) Filed: Feb. 26, 2021

(65) Prior Publication Data
US 2021/0185603 A1 Jun. 17, 2021

Related U.S. Application Data

(63) Continuation of application No. 16/458,315, filed on Jul. 1, 2019, now Pat. No. 10,959,169, which is a continuation of application No. 15/788,900, filed on Oct. 20, 2017, now Pat. No. 10,383,046.

(51) Int. Cl.
*H04W 48/18* (2009.01)
*H04W 28/16* (2009.01)
*H04W 36/32* (2009.01)
*H04W 36/00* (2009.01)

(52) U.S. Cl.
CPC .......... *H04W 48/18* (2013.01); *H04W 28/16* (2013.01); *H04W 36/0022* (2013.01); *H04W 36/32* (2013.01)

(58) Field of Classification Search
CPC . H04W 48/18; H04W 28/16; H04W 36/0022; H04W 36/32; H04W 36/24
See application file for complete search history.

(56) References Cited

U.S. PATENT DOCUMENTS

| | | | |
|---|---|---|---|
| 2017/0070892 A1* | 3/2017 | Song | H04W 48/20 |
| 2017/0079059 A1* | 3/2017 | Li | H04W 16/02 |
| 2017/0164349 A1 | 6/2017 | Zhu et al. | |

(Continued)

FOREIGN PATENT DOCUMENTS

WO WO-2019076681 A1 * 4/2019 ............ H04W 48/14

*Primary Examiner* — Rina C Pancholi

(57) ABSTRACT

A method, a device, and a non-transitory storage medium are described in which a radio access network slice and core network slice service is provided based on RAN-CN network slice pairing information. A radio access network slice and/or a core network slice uses the RAN-CN network slice pairing information to select network resources to support sessions of end devices. The RAN-CN network slice pairing information may include location information, radio access network slice information, core network slice information correlated to different types or applications or services available to end devices. The RAN-CN network slice pairing information may include information indicating current and available radio access network resources pertaining to the radio access network slices and threshold resources that may be used to support the different types of applications or services.

20 Claims, 18 Drawing Sheets

(56) References Cited

U.S. PATENT DOCUMENTS

| | | | |
|---|---|---|---|
| 2017/0367036 A1* | 12/2017 | Chen | H04L 43/10 |
| 2018/0302877 A1* | 10/2018 | Bosch | H04W 84/00 |
| 2018/0324761 A1 | 11/2018 | Velev et al. | |
| 2019/0058997 A1 | 2/2019 | Futaki et al. | |
| 2020/0029322 A1* | 1/2020 | Yu | H04W 60/00 |
| 2020/0053531 A1* | 2/2020 | Myhre | H04W 48/18 |

* cited by examiner

| | RAN | | | APPLICATIONS/SERVICES | | | | | |
|---|---|---|---|---|---|---|---|---|---|
| Location | Access Network Device | Available Resources | Application/ Service Resources | MTC | Delay-tolerant (DT) | Real-Time (RT) | Urgent | | |
| Longitude Lattitude | eNB | Available Resources | Radio/Physical MTC/DT/RT | Core Slice 1234 | Core Slice 1555 | Core Slice 3435 | Core Slice 7744 | ••• | ← 240 |
| Longitude Lattitude | gNB | Available Resources | Radio/Physical MTC/DT/RT/ Urgent | Core Slice 445A | Core Slice 4499 | Core Slice 2525 | Core Slice 2525 | ••• | ← 235 |
| | | | | | | | | ••• | ← 230 |
| | | | | | | | | ••• | ← 225 |
| | | | | | | | | ••• | ← 220 |
| | | | | | | | | ••• | ← 215 |
| | | | | | | | | ••• | ← 210 |
| | | | | | | | | ••• | ← 205 |

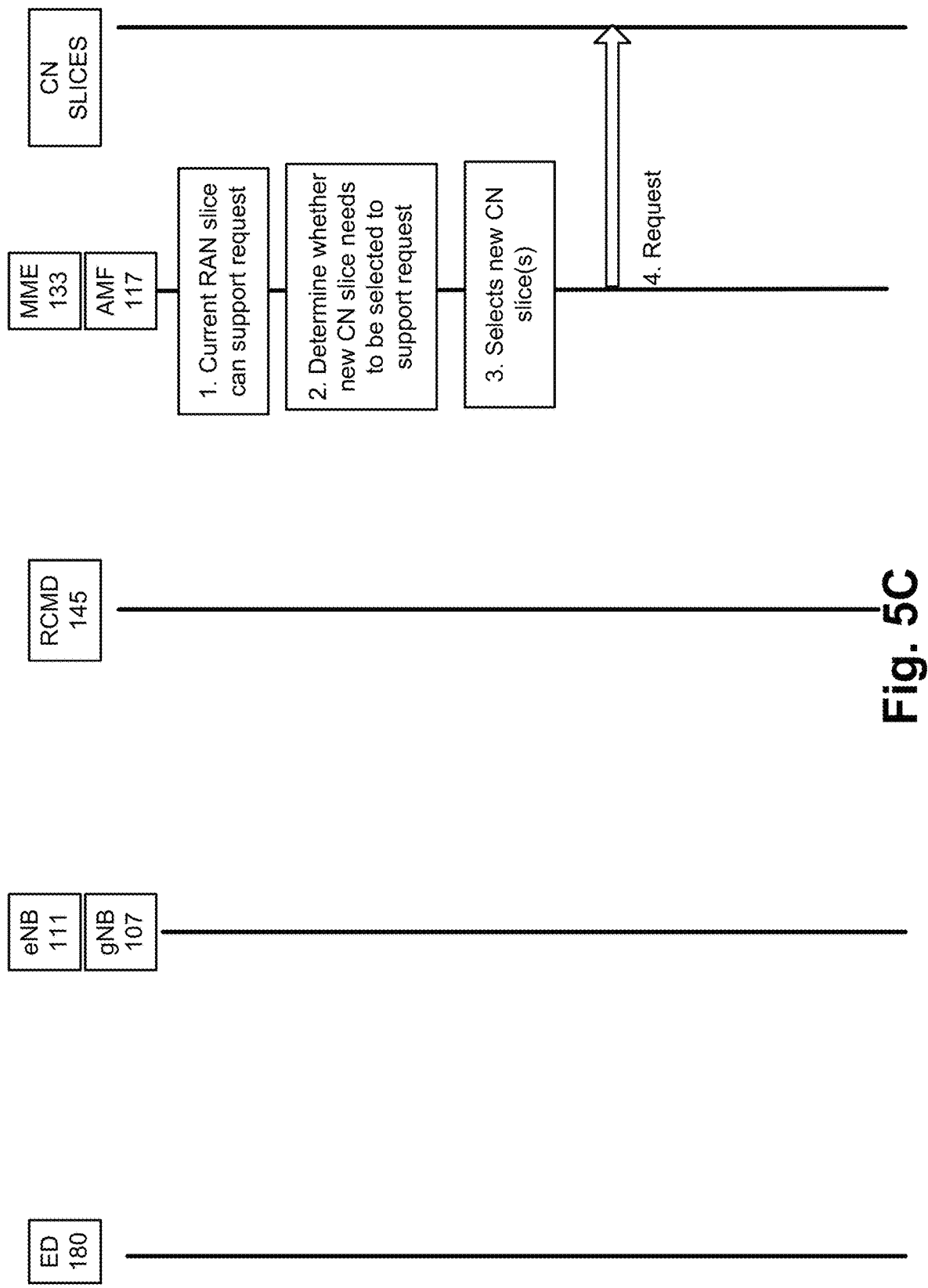

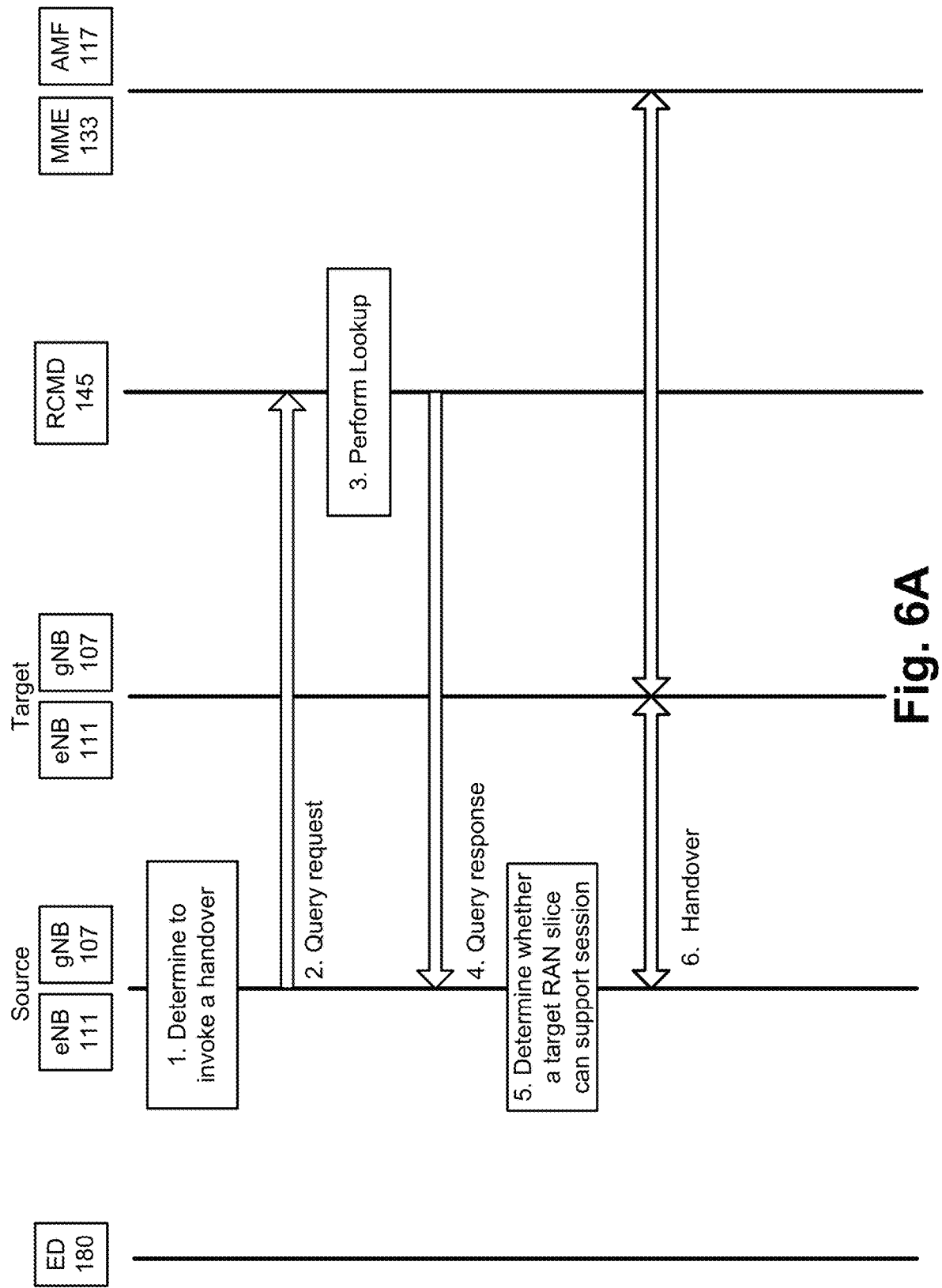

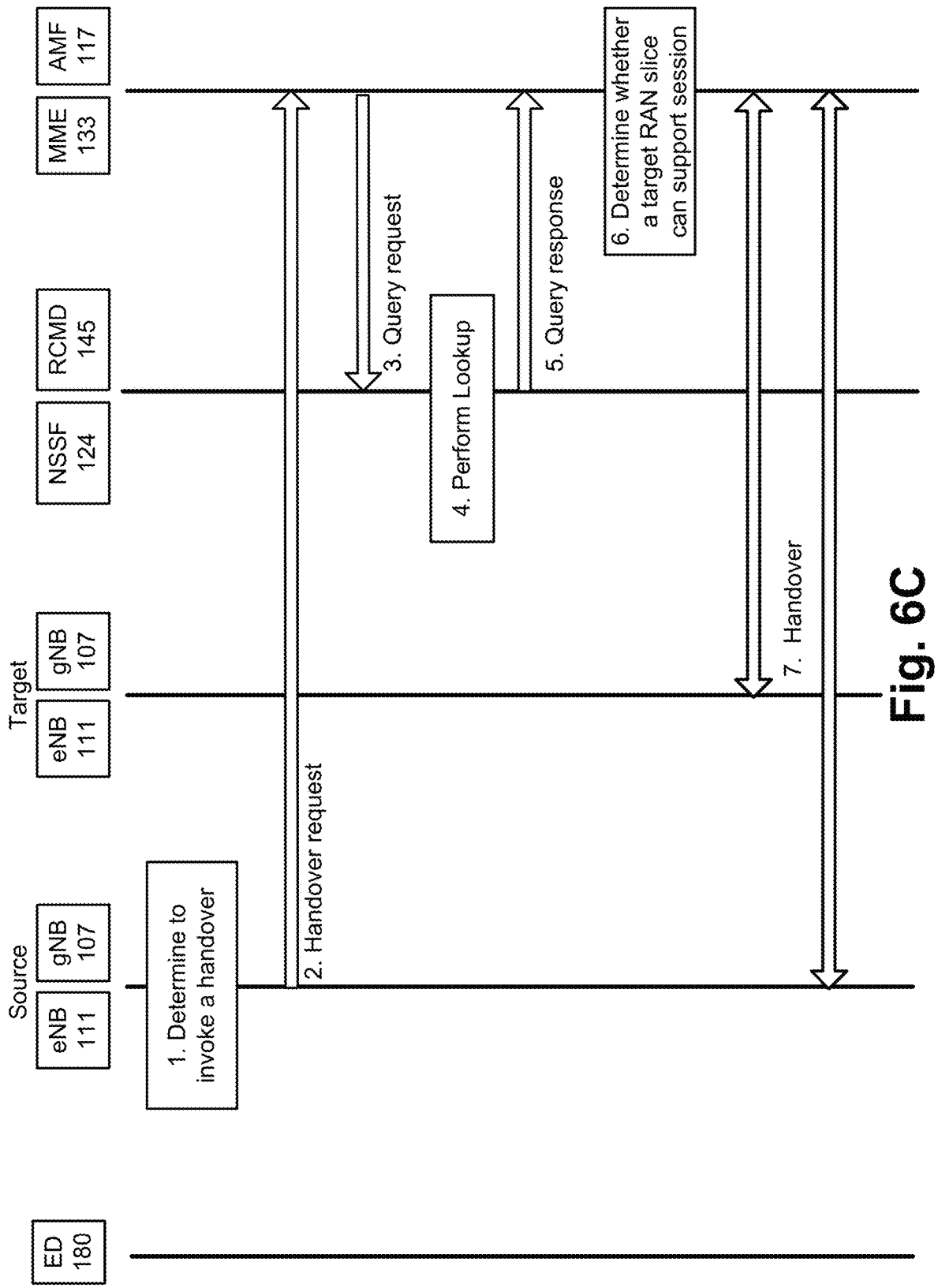

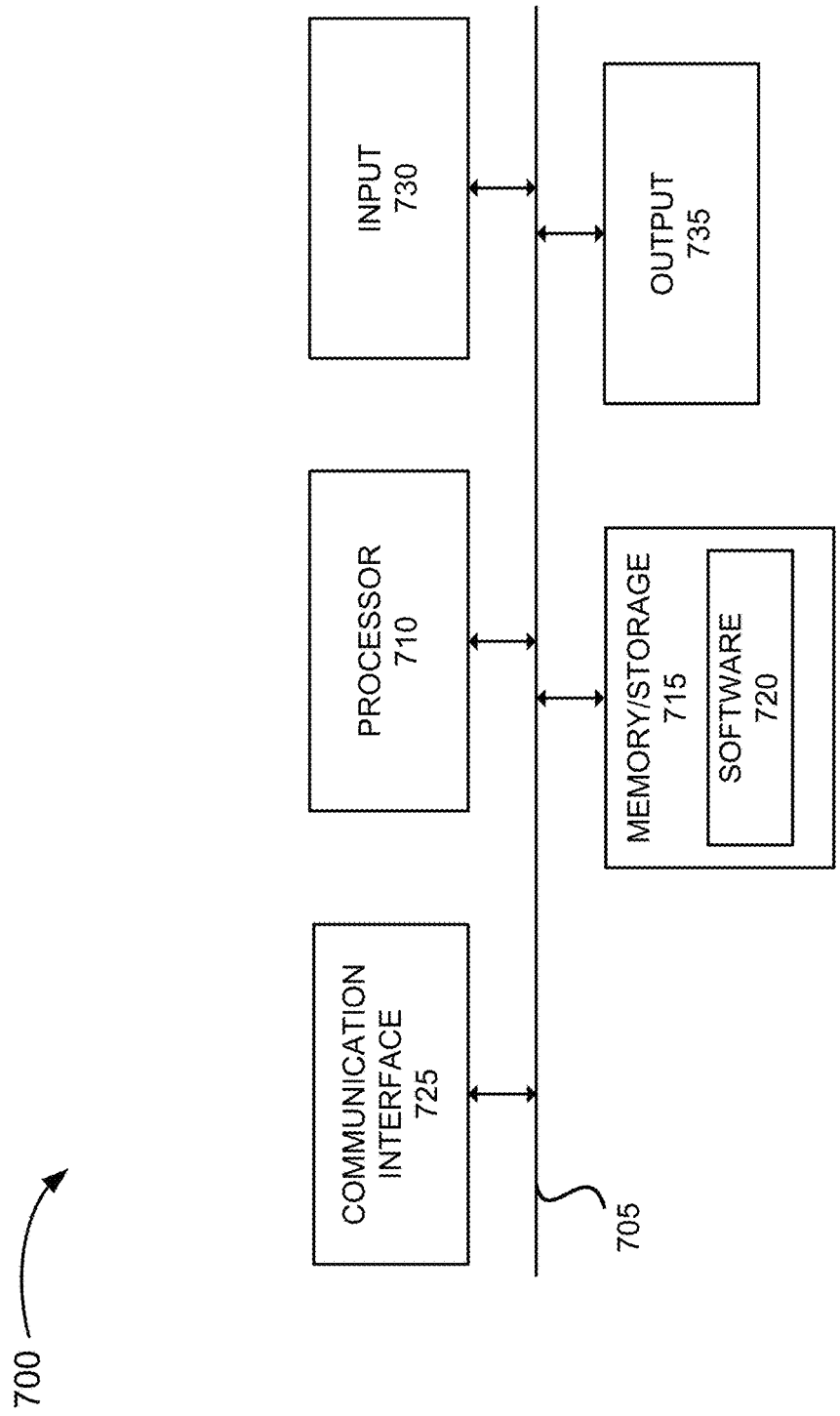

RAN-CORE PAIRING SERVICE

CROSS REFERENCE TO RELATED APPLICATION

This patent application is a continuation of U.S. patent application Ser. No. 16/458,315, filed on Jul. 1, 2019, which is a continuation of U.S. patent application Ser. No. 15/788,900, filed on Oct. 20, 2017, now U.S. Pat. No. 10,383,046 issued Aug. 13, 2019, both entitled RAN-Core Pairing Service, the disclosures of which are incorporated by reference herein in their entirety.

BACKGROUND

The development and design of next generation wireless networks (e.g., Fifth Generation (5G) networks) is currently underway by various organizations, service providers, and so forth. For example, the development and design of next generation wireless networks may be based on cloud technologies, software defined networking (SDN), and network function virtualization (NFV).

BRIEF DESCRIPTION OF THE DRAWINGS

FIG. 2 is a diagram illustrating exemplary RAN-CN network slice pairing information;

FIGS. 5A-5D are diagrams illustrating further exemplary processes of exemplary embodiments of the RAN-CN pairing service;

FIGS. 6A-6C are diagrams illustrating still other exemplary processes of exemplary embodiments of the RAN-CN pairing service;

FIG. 7 is a diagram illustrating exemplary components of a device that may correspond to one or more of the devices illustrated and described herein;

DETAILED DESCRIPTION OF PREFERRED EMBODIMENTS

Figure 1A:
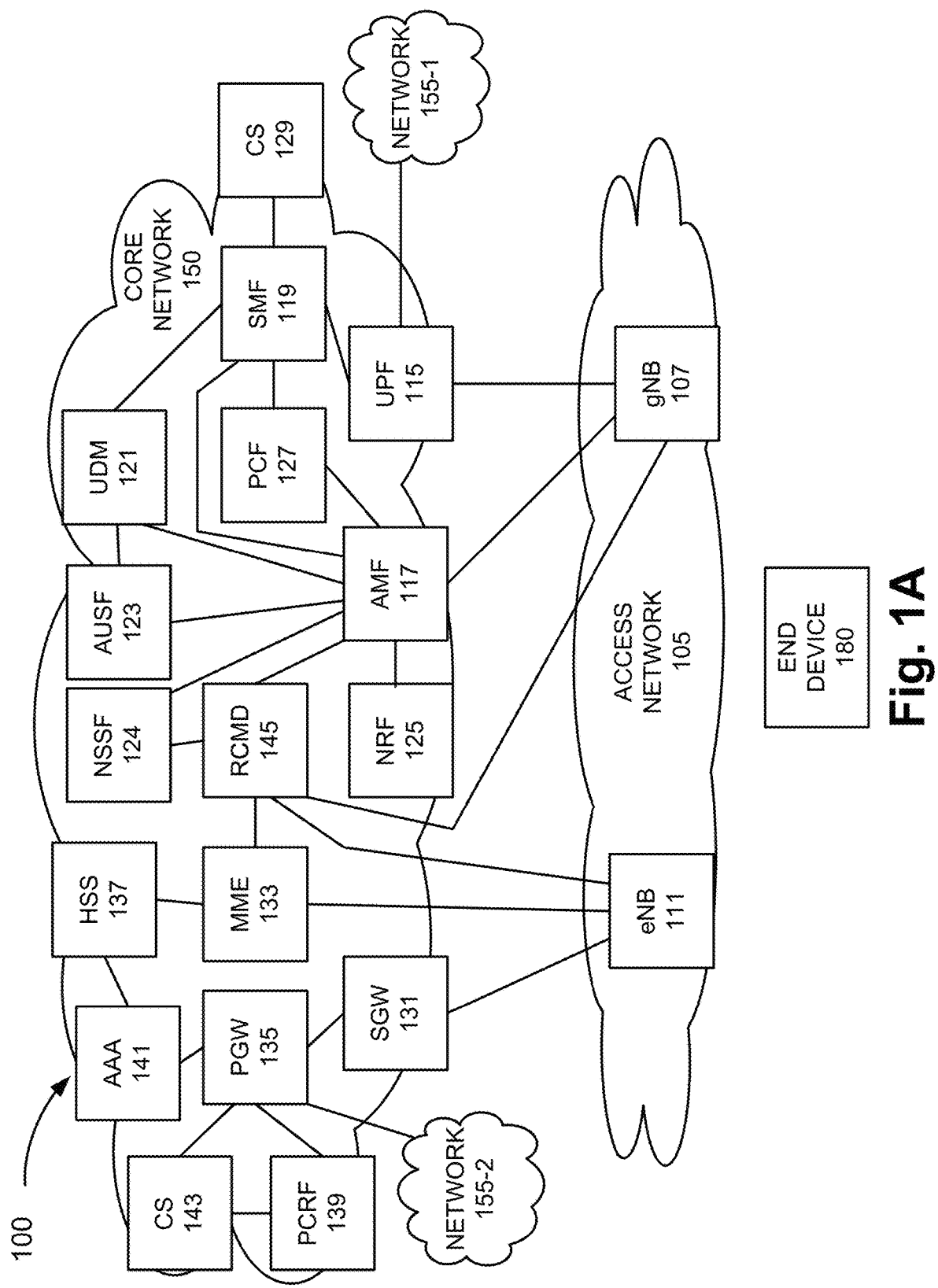
FIG. 1A is a diagram illustrating an exemplary environment in which an exemplary embodiment of a radio access network-core network (RAN-CN) pairing service may be implemented.

The following detailed description refers to the accompanying drawings. The same reference numbers in different drawings may identify the same or similar elements. Also, the following detailed description does not limit the invention.

A next generation wireless network should support various use cases, meet various performance metrics, allow for scalability and flexibility, and so forth. One approach to meet such criteria is to use network slicing from end-to-end (e.g., from a radio access network (RAN) through a core network (CN)). Network slicing of the RAN and CN may enable each use case or end device request to be served by a "network slice" (e.g., physical resources, logical resources, virtual resources, etc.) of the network. Network slicing may be implemented based on cloud technologies, SDN, NFV, network orchestration, OpenFlow, etc., and network slices (e.g., RAN slices and CN slices) may be configured to meet specific applications, services, and end devices demands. The RAN and the CN may include various network functions, each of which may be sliced. According to various implementations, a network function may be support one or multiple network slices.

An end device, which is connected to the RAN and the CN, may use one or multiple RAN slices and one or multiple CN slices depending on the configuration of the network slices and the applications and/or services requested. For example, the network slicing model may pair RAN slices and CN slices that support an application and/or a service. By way of further example, the pairing between RAN slices and CN slices may be implemented as 1:1 or M:N, in which M≥1 and N≥1.

While network slicing holds promise for next generation wireless networks, currently no existing mechanism provides dynamic pairing of network slices based on the availability of RAN and CN resources by location.

According to exemplary embodiments, a RAN-CN pairing service is described. According to an exemplary embodiment, the RAN-CN pairing service uses a RAN-Core Mapping Database (RCMD). The RCMD stores RAN-CN network slice pairing information that supports the RAN-CN pairing service. The RAN-CN network slice pairing information includes correlated information between RAN slices and CN slices. According to an exemplary embodiment, the RAN-CN network slice pairing information includes location information, RAN slice information, and CN slice information correlated to different types or categories of applications or services available to end devices. The RAN-CN network slice pairing information may include information indicating current and available RAN resources pertaining to the RAN slices and threshold RAN resources that support the different types of applications or services. According to an exemplary embodiment, network slice selection may be initiated from the end device side or the network-side. According to an exemplary embodiment, the RAN-CN pairing service may be used for uplink traffic, downlink traffic, or both.

As a result, the RAN-CN pairing service provides dynamic pairing of RAN and CN slices based on location and current and available network slice resources.

FIG. 1A is a diagram illustrating an exemplary environment 100 in which an exemplary embodiment of the RAN-CN pairing service may be implemented. As illustrated, environment 100 includes an access network 105, a core network 150, and networks 155-1 and 155-2 (also referred to collectively as networks 155 and, individually or generally as networks 155). According to other embodiments, environment 100 may include additional networks, fewer networks, and/or different types of networks than those illustrated and described herein.

Environment 100 also includes an end device 180. The number and arrangement of network devices (also known as network elements or network functions) in access network 105 and core network 150, and the number of end devices 180 are exemplary. A network device, a network element, or a network function (referred to herein simply as a network device) may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). The number and the type of network devices illustrated in environment 100 are exemplary.

Environment 100 includes communication links between the networks and between the network devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1A. The number and the arrangement of communication links illustrated in environment 100 are exemplary.

Access network 105 includes one or multiple networks of one or multiple types. For example, access network 105 may be implemented to include a terrestrial wireless network. According to an exemplary embodiment, access network 105 may include a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), and/or a future or next generation RAN (e.g., a Fifth Generation (5G)-access network (5G-AN) or a 5G-RAN).

According to other embodiments, access network 105 may include a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

Access network 105 may also include other types of networks, such as a WiFi network, a Worldwide Interoperability for Microwave Access (WiMAX) network, a local area network (LAN), a personal area network (PAN), or other type of network that provides access to or can be used as an on-ramp to core network 150. Depending on the implementation, access network 105 may include various types of wireless network devices, such as, for example, a base station (BS), a base transceiver station (BTS), a Node B, an evolved Node B (eNB), a next generation Node B (gNB), a remote radio head (RRH), an RRH and a baseband unit (BBU), a BBU, a radio network controller (RNC), a wireless node (e.g., a small cell node (e.g., a picocell device, a femtocell device, a microcell device, a home eNB, a repeater, etc.)), a radio unit, a roadside unit, a 5G wireless access node, or other type of wireless station that provides wireless access to core network 150. According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies, wireless standards, wireless frequencies/bands, and so forth.

As illustrated in FIG. 1A, however, for purposes of description, exemplary access network 105 includes a gNB 107 and an eNB 111. According to various exemplary embodiments, gNB 107 and eNB 111 may operate and provide a function according to a wireless standard (e.g., 3rd Generation Partnership Project (3GPP), International Telecommunication Union (ITU), etc.) and/or a proprietary technology. According to an exemplary embodiment, gNB 107 and eNB 111 each includes logic that provides a RAN-CN pairing service, as described herein. Additionally, according to an exemplary embodiment, gNB 107 and eNB 111 each includes a communication interface that provides for the transmission and/or reception of data that supports the RAN-CN pairing service, as described herein. According to other exemplary embodiments, access network 105 may include additional and/or different network devices (e.g., BS, BTS, a Node B, etc.) that may include logic and a communication interface that provide the RAN-CN pairing service, as described herein.

Core network 150 includes one or multiple networks of one or multiple types. For example, core network 150 may be implemented to include a terrestrial network. According to an exemplary implementation, core network 150 includes a complementary network pertaining to the one or multiple RANs described. For example, core network 150 may include the core part of an LTE network, an LTE-A network, a CDMA network, a GSM network, and so forth. Depending on the implementation, core network 150 may include various network devices, such as, for example, a gateway device, a support node, a serving node, a mobility management entity (MME), as well other network devices that provide various network-related functions and/or services, such as charging and billing, security, authentication and authorization, network policy enforcement, management of subscriber profiles, and/or other functions and/or services that facilitate the operation of core network 150.

As illustrated in FIG. 1A, however, for purposes of description, exemplary core network 150 includes a core network of an LTE network or LTE-A network (e.g., an Evolved Packet Core (EPC) network) and, a next generation core network (e.g., a 5G core network). For example, with respect to network devices of the next generation core network, core network 150 may include a user plane function (UPF) 115, a core access and mobility management function (AMF) 117, a session management function (SMF) 119, a unified data management (UDM) device 121, an authentication server function (AUSF) 123, a network slice selection function (NSSF) 124, a network repository function (NRF) 125, a policy control function (PCF) 127, and a charging system (CS) 129. According to other exemplary embodiments, the next generation core network may include additional, different, and/or fewer network devices than those illustrated and described herein.

As further illustrated, with reference to the network devices of the EPC network, core network 150 may include a serving gateway 131, an MME 133, a packet data network (PDN) gateway (PGW) 135, a home subscriber server (HSS) 137, a policy charging and rules function (PCRF) 139, an authentication, authorization, and accounting (AAA) server 141, and a CS 143. According to other exemplary embodiments, the EPC network may include additional, different, and/or fewer network devices than those illustrated and described herein.

According to various exemplary embodiments, UPF 115, AMF 117, SMF 119, UDM 121, AUSF 123, NSSF 124, NRF 125, PCF 127, CS 129, SGW 131, MME 133, PGW 135, HSS 137, PCRF 139, AAA 141, and CS 143 may operate and provide a function according to a standard (e.g., 3GPP, ITU, etc.) and/or a proprietary technology. According to an exemplary embodiment, one or multiple network devices of the next generation core network and one or multiple network devices of the EPC network may include logic that provides a RAN-CN pairing service, as described herein. Additionally, according to an exemplary embodiment, such network device may include a communication interface that provides for the transmission and/or reception of data that supports the RAN-CN pairing service, as described herein. For purposes of description, however, with respect to core network 150 of environment 100, according to an exemplary embodiment, AMF 117 and MME 133 may each include logic and a communication interface that supports the RAN-CN pairing service. For example, as described herein, as a part of the RAN-CN pairing service, AMF 117 or MME 133 may query RCMD 145 for RAN-CN network slice pairing information, and may select RAN-CN network slices. According to another exemplary embodiment, NSSF 124 may include logic and a communication interface that supports the RAN-CN pairing service. For example, as described herein, as a part of the RAN-CN pairing service, NSSF 124 may query RCMD 145 and may select the RAN-CN network slices. According to other exemplary embodiments, core network 150 may include additional and/or different network devices (e.g., a Serving General Packet Radio Service (GPRS) Support Node (SSGN), a Gateway GPRS Support Node (GGSN), a Home Agent (HA), a Packet Data Serving Node (PDSN), a High Rate Packet Data (HRPD) Serving Gateway (HSGW), etc.) that may include logic and a communication interface that provides the RAN-CN pairing service, as described herein.

According to an exemplary embodiment, environment 100 includes an RCMD 145. According to an exemplary embodiment, RCMD 145 may be included in core network 150. Additionally, or alternatively, RCMD 145 may be included in access network 105 (not illustrated in FIG. 1A). RCMD 145 may be implemented according to various computer architectures (e.g., centralized, distributed, etc.), network architectures (e.g., server, etc.), and so forth, as previously described herein.

RCMD 145 may include a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). RCMD 145 may include a storage device that stores a database. RCMD 145 may include logic that stores RAN-CN network slice pairing information, and performs other storage-related functions, such as, deletes, updates, searches or lookups, etc., pertaining to the RAN-CN network slice pairing information in support of the RAN-CN pairing service. Also, RCMD 145 may include a communication interface that provides for the transmission and/or reception of data that supports the RAN-CN pairing service. For example, RCMD 145 may communicate with network devices of access network 105 and core network 150. RCMD 145 is described further below.

Network 155 may include one or multiple networks of one or multiple types and technologies. For example, network 155 may be implemented to provide an application and/or a service to end device 180. By way of further example, network 155 may include the Internet, the World Wide Web, an Internet Protocol Multimedia Subsystem (IMS) network, a Rich Communication Service (RCS) network, a cloud network, a packet-switched network, a private network, a public network, a telecommunication network, an IP network, a Multimedia Broadcast and Multicast Service (MBMS) network, or some combination thereof. Although not illustrated in FIG. 1A, depending on the implementation of network 155, network 155 may include various network devices, such as, for example, a server (e.g., a Voice over Internet Protocol (VoIP) server, a streaming server, an end-user application server, a Session Initiation Protocol (SIP) server, an e-mail server, a web server, an application server, etc.), a Short Message Service Center (SMSC), a Multimedia Message Service Center (MMSC), a Call Session Control Function (CSCF), a file server, and so forth. For purposes of description, a network device of network 155 may be referred to as destination device.

End device 180 includes a device that has computational and wireless communication capabilities. End device 180 may be implemented as a mobile device, a portable device, or a stationary device. End device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of wireless end node. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or some other type of wireless user device. According to various exemplary embodiments, end device 180 may be configured to execute various types of software (e.g., applications, programs, etc.). The number and the types of software may vary among end devices 180. End device 180 may support multiple radio access technologies (RATs) (e.g., 4G, 5G, etc.), multiple frequency bands, and so forth. Additionally, end device 180 may include multiple communication interfaces that provide multiple and simultaneous connections via the same or different RATs, frequency bands, and so forth. The multimode capabilities of end device 180 may vary among end devices 180.

Figure 1B:
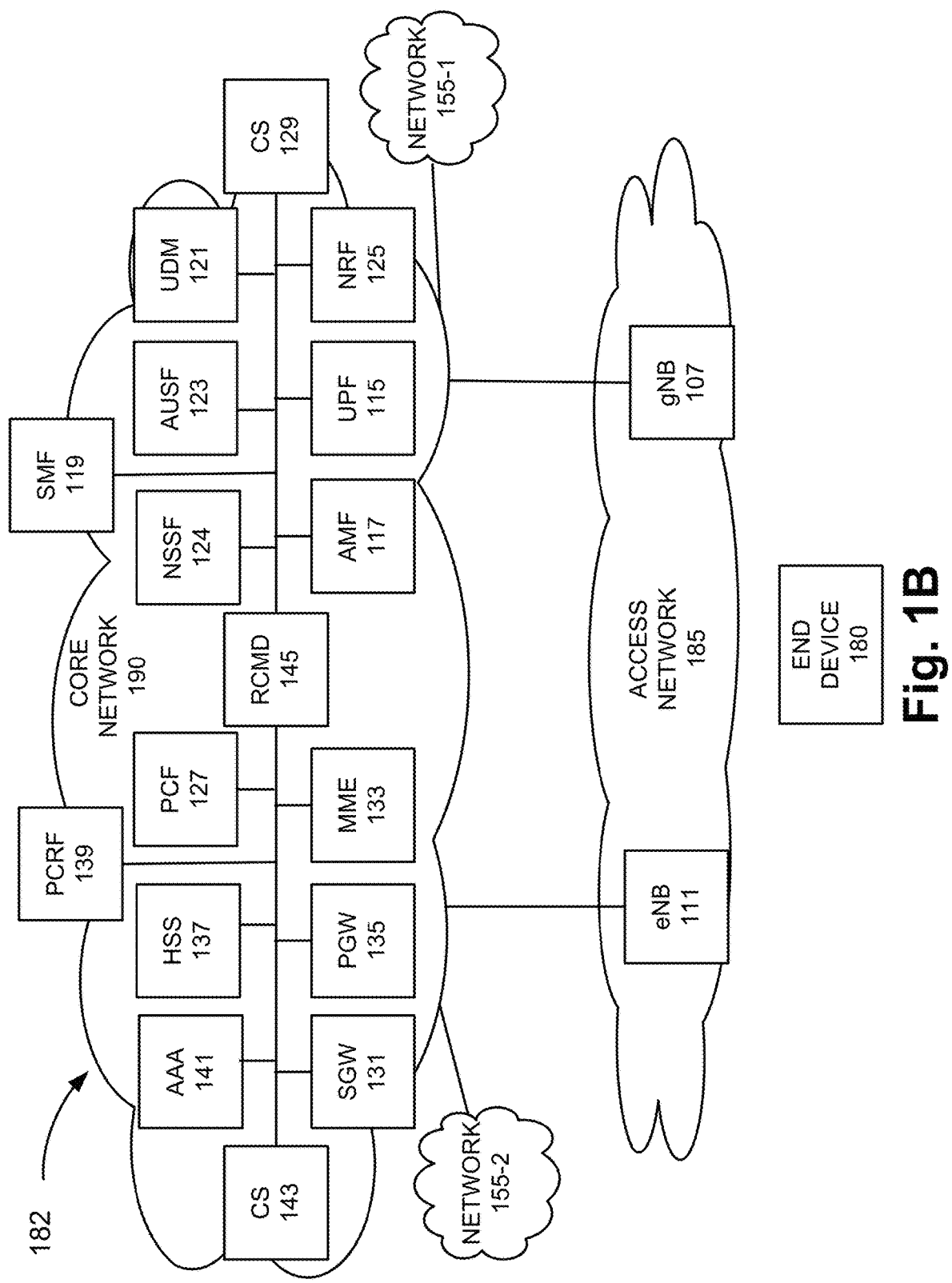
FIG. 1B is a diagram illustrating another exemplary environment in which an exemplary embodiment of the RAN-CN pairing service may be implemented.

FIG. 1B is a diagram illustrating another exemplary environment 182 in which an exemplary embodiment of the RAN-CN pairing service may be implemented. As illustrated, environment 182 includes an access network 185, a core network 190, and networks 155. Environment 182 also includes end device 180. According to other embodiments, environment 182 may include additional networks, fewer networks, and/or different types of networks than those illustrated and described herein. The number and arrangement of network devices in access network 185 and core network 190, and the number of end devices 180 are exemplary.

In contrast to environment 100, which may be considered a reference point representation that may focus on the interaction between pairs of network devices defined by a point-to-point reference point, environment 182 may be considered a service based representation in which a network device allows other network devices, which have been authorized, to access its services. For example, a network device may offer one or multiple network services, and the network device exposes the network service via a service based interface. As illustrated, access network 185 and core network 190 may include network devices previously described. The number and the arrangement of communication links illustrated in environment 182 are exemplary.

As previously described, RCMD 145 may store RAN-CN network slice pairing information. According to an exemplary embodiment, the RAN-CN network slice pairing information includes information that indicates pairings between RAN slices and CN slices. A RAN slice and a CN slice may be configured to support an end-to-end connection or session between end device 180 and a destination device (e.g., residing in network 155). The RAN slice and the CN slice may each include physical network resources (e.g., processor, communication interface, memory, etc.) of a network device. According to an exemplary implementation, correlations of the RAN slices to the CN slices may be based on the application or the service requested by end device 180 and location. Additionally, or alternatively, according to other exemplary implementations, the correlation of the RAN slices and the CN slices may be based on other parameters, such as, for example, the type of end device 180 (e.g., an IoT device, an eMTC device, an NB-IoT device, a user device, a 5G device, etc.), the category of end device 180 (e.g., LTE UE category (e.g., class 1, class 2, etc.), a 5G category, etc), the RAT type, and/or other characteristics of the session, end device 180, the destination device, and so forth.

Referring to FIG. 2, exemplary RAN-CN network slice pairing information may be stored in a table 200 that includes a location field 205, an access network device field 210, an available resources field 215, an application/service resources field 220, a machine-type communication application field 225, a delay-tolerant application field 230, a real-time application field 235, and an urgent application field 240. As further illustrated, table 200 includes records 250-1 through 250-X that each includes a grouping of fields 205 through 240 that may be correlated. RAN-CN network slice pairing information is illustrated in tabular form merely for the sake of description. RAN-CN network slice pairing information may be implemented in a data structure different from a table.

Location field 205 may store data indicating a location of the network device identified in access network device field 210. According to various exemplary implementations, the data may include one or multiple instances of data indicative of a locale or geographic area, such as, for example, a service area name (e.g., Times Square, Fenway Park, Northeast Boston, etc.), a service area identifier (e.g., a numerical string, an alphanumeric string, etc.), a Tracking Area Code (TAC), a Global Positioning System (GPS) coordinate (e.g., latitude and longitude), or other geographic location (e.g., data indicating a state, a county, a city, a town, and/or a zip code, or portion thereof). According to various exemplary implementations, the size of the locale may vary. For example, the locale may include a single cell associated with a network device or multiple cells associated with multiple network devices.

Access network device field 210 may store data pertaining to a network device included in access network 105. For example, access network device field 210 may store data indicating the type of network device (e.g., eNB, gNB, etc.). According to various exemplary implementations, the number of network devices may vary from a single network device to multiple network devices (e.g., a group). When there are multiple network devices, the types of network devices may or may not be the same. For example, in one locale, there may be one or multiple eNBs, one or multiple gNBs, or a combination thereof. Access network device field 210 may store other data, such as, a network device identifier (e.g., a global eNB identifier, a global gNB identifier, etc.), a cell identifier (e.g., an E-UTRAN cell global identifier (ECGI), etc.), a physical cell identifier (PCI)), a group identifier (e.g., an identifier that indicates a group of eNBs that belong to the group) or other type of data that identifies the network device (e.g., uniquely, as part of a group, etc.). Access network device field 210 may store data pertaining to the frequency band, channel, and/or other wireless communication-related attributes associated with the network device.

Available resources field 215 may store data that indicates available network resources pertaining to network devices of the RAN. According to various exemplary embodiments, the parameters used to indicate the available network resources may vary depending on the network device (e.g., gNB, eNB, etc.) and network slice. For example, with respect to network devices of the RAN, the parameters may include available radio resources (e.g., physical resource blocks, resource elements, transmission time slots, uplink, downlink, guaranteed bit rate, non-guaranteed bit rate, bandwidth, etc.), the number of available connections, available physical resources (e.g., processor utilization, memory utilization, communication interface utilization (e.g., transmitter, receiver, etc.)), and/or other types of available physical, virtual, and/or logical resources that may pertain to the provisioning of wireless access.

As previously described, according to an exemplary embodiment, the correlations or the pairings of the RAN slices to the CN slices may be based on the application or the service requested by end device 180. However, according to other exemplary embodiments, as previously described, the pairings of the network slices may be based on other factors. According to this example of RAN-CN network slice pairing information, the types of applications or service may be categorized as MTC, delay-tolerant, real-time, and urgent. According to other exemplary implementations, the type of applications or services may include additional, fewer, and/or different types of applications or services than those illustrated in FIG. 2 and described. For example, application or service types may include voice, web, streaming, alternate reality/virtual reality, mobile broadband, high bandwidth, low latency, a specific name of an application, and/or other category that may be based on the type of traffic (e.g., intermittent traffic, non-intermittent traffic, etc.), the type of end device 180 (e.g., eMTC, 5G device, etc.), priority of service, or other attribute. The nomenclature directed to the application or service types is exemplary.

Application/service resource field 220 may store data that indicates minimum or threshold amounts of resources needed to support the type of application or service on which the RAN-CN pairing service may be based. According to this example, the minimum resources correspond to the minimum RAN resources to support the type of application or service associated with fields 225-240. According to an exemplary embodiment, the parameters used to indicate the minimum RAN resources correspond to the parameters used to indicate the available resources in available resources field 215. In this way, the RAN-CN pairing service may compare an available resource parameter and parameter value to a corresponding minimum RAN resource parameter and parameter value to determine whether a RAN slice is suitable for pairing with a CN slice. For example, application/service resource field 220 may store parameters and parameter values that indicate minimum radio resources (e.g., physical resource blocks, resource elements, uplink, downlink, guaranteed bit rate, non-guaranteed bit rate, bandwidth, etc.), minimum number of connections, minimum physical resources (e.g., processor utilization, memory utilization, communication interface utilization (e.g., transmitter, receiver, etc.)), and/or other types of minimum physical, virtual, and/or logical resources to be used to support the type of application or service.

According to various exemplary embodiments, a single network device or a group of network devices of a locale may support all or only some types of applications or services. According to various exemplary embodiments, within a group of network devices of a locale, a network device of the group may support some types of applications or services, while another network device of the group of the same locale may support other types of applications or services. For example, a group of network devices of the locale may include gNB 107 and eNB 111, in which gNB 107 may support all types of applications or services while eNB 111 may support only a portion of the types of applications or services. According to various exemplary embodiments, the RAN-CN network slice pairing information stored in available resources field 215 and application/service resources field 220 may be correlated to a single network device or multiple network devices located in a same location of location field 205.

As described herein, fields 225 through 240 may store data that identifies a CN slice that is configured to support a type of application or service in relation to location and a RAN device. According to various exemplary implementations, the data may pertain to one or multiple network devices of the core network. For example, in the EPC network of core network 150, the data may indicate a network slice pertaining to MME 133, or MME 133 and PGW 135, or MME 133, PGW 135, and SGW 131, or other combination of network devices of the EPC network (e.g., SGW 131 and PGW 135, etc.). Similarly, for example, for the 5G core of core network 150, the data may indicate a network slice pertaining to AMF 117, or AMF 117 and UPF 115, or AMF 117, UPF 115, and SMF 119, or other combination of network devices of the 5G core network (e.g., UPF 115 and SMF 119, etc.).

Machine-type communication field 225 may store data indicating an identifier of a CN slice that is configured to support an MTC application or service. For example, the CN slice may be configured and/or includes network resources to support an IoT application or service, or similarly categorized application or service.

Delay-tolerant field 230 may store data indicating an identifier of a CN slice that is configured to support a delay-tolerant application or service. For example, the CN slice may be configured and/or includes network resources to support web browsing, e-mail, Instant Messaging (IM), or similarly categorized application or service.

Real-time application field 235 may store data indicating an identifier of a CN slice that is configured to support a real-time application or service. For example, the CN slice may be configured and/or includes network resources to support a video conferencing, location tracking, or similarly categorized application or service.

Urgent field 240 may store data indicating an identifier of a CN slice that is configured to support an urgent application or service. For example, the CN slice may be configured to support a medical, a mission critical, or similarly categorized application or service.

According to other exemplary implementations, table 200 may store additional, fewer, and/or different instances of RAN-CN network slice pairing information in support of the RAN-CN pairing service, as described herein. For example, the values of RAN-CN network slice pairing information, the number of data instances of RAN-CN network slice pairing information in each field, and the type of RAN-CN network slice pairing information illustrated in table 200 are exemplary.

Figure 3:
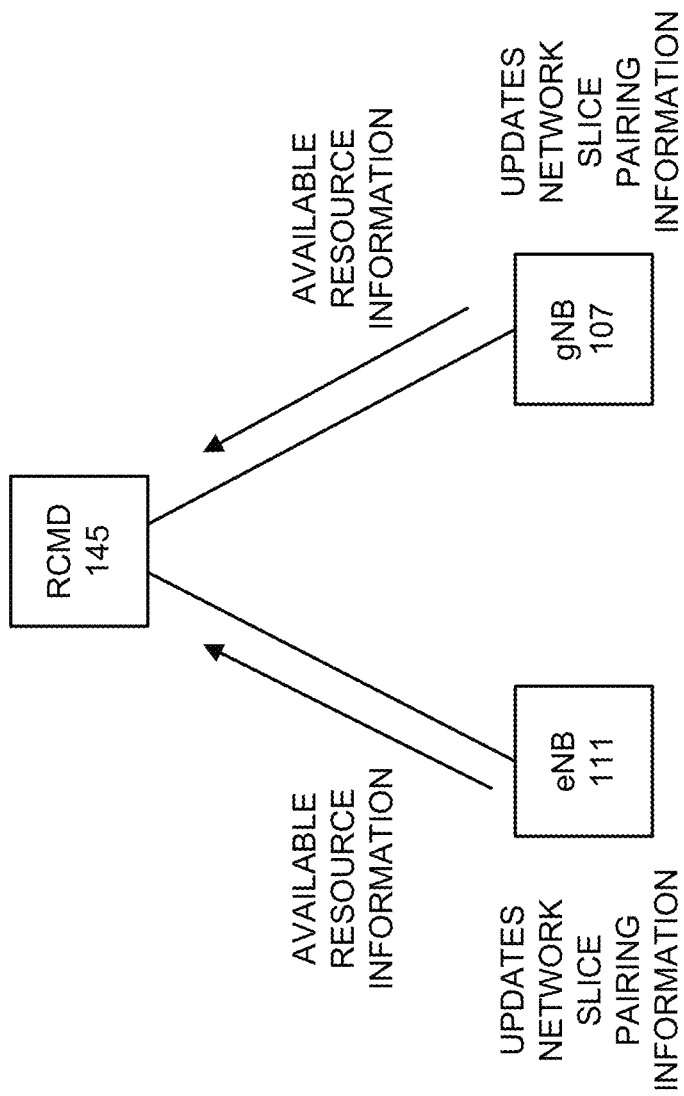
FIG. 3 is a diagram illustrating an exemplary process of an exemplary embodiment of the RAN-CN pairing service that updates the RAN-CN network slice pairing information.

According to an exemplary embodiment, the RAN-CN pairing service includes an updating procedure. For example, the available resources of a RAN device may provide available network resource information to RCMD 145. Referring to FIG. 3, gNB 107 and eNB 111 may update RCMD 145 with available resource information. gNB 107 and eNB 111 may each include logic that evaluates the available resources, generates an update message that includes the available resource information, and transmits the update message to RCMD 145.

According to an exemplary embodiment, the updating procedure may be invoked in response to various triggering events. For example, the triggering events may include receipt and/or transmission of various messages that occur during various procedures, such as during an attachment procedure, a handover procedure (e.g., Inter-RAN device handover, Intra-RAN device handover, Inter-RAT handover, etc.), a bearer establishment procedure, or other types of procedures that may occur subsequent to an attachment between the RAN device and end device 180. By way of further example, the triggering events may include various messages including a request to establish a radio connection with end device 180, a request to attach with end device 180, a request to establish a bearer (e.g., a radio bearer, a bearer between the RAN device and a network device of core network 150) for end device 180, a request for handover from another RAN device, and so forth.

Additionally, or alternatively, according to an exemplary embodiment, the updating procedure may be performed periodically based on a timer or clock, on-demand (e.g., a request received from another network device (e.g., RCMD 145)), and/or based on some other configurable mechanism. By way of example, the configurable mechanism may be based on an available resource parameter value (e.g., when resource availability is above a threshold value). The threshold value may or may not correspond to a minimum threshold value pertaining to application/service resources field 220. According to another example, the triggering event may include exceeding a limit of resources, such as exceeding a limit of bearer connections on a RAN device, a limit of a particular type of bearer connections (e.g., real-time, etc.) on a RAN device, and/or other types of network resources.

Figure 4A:
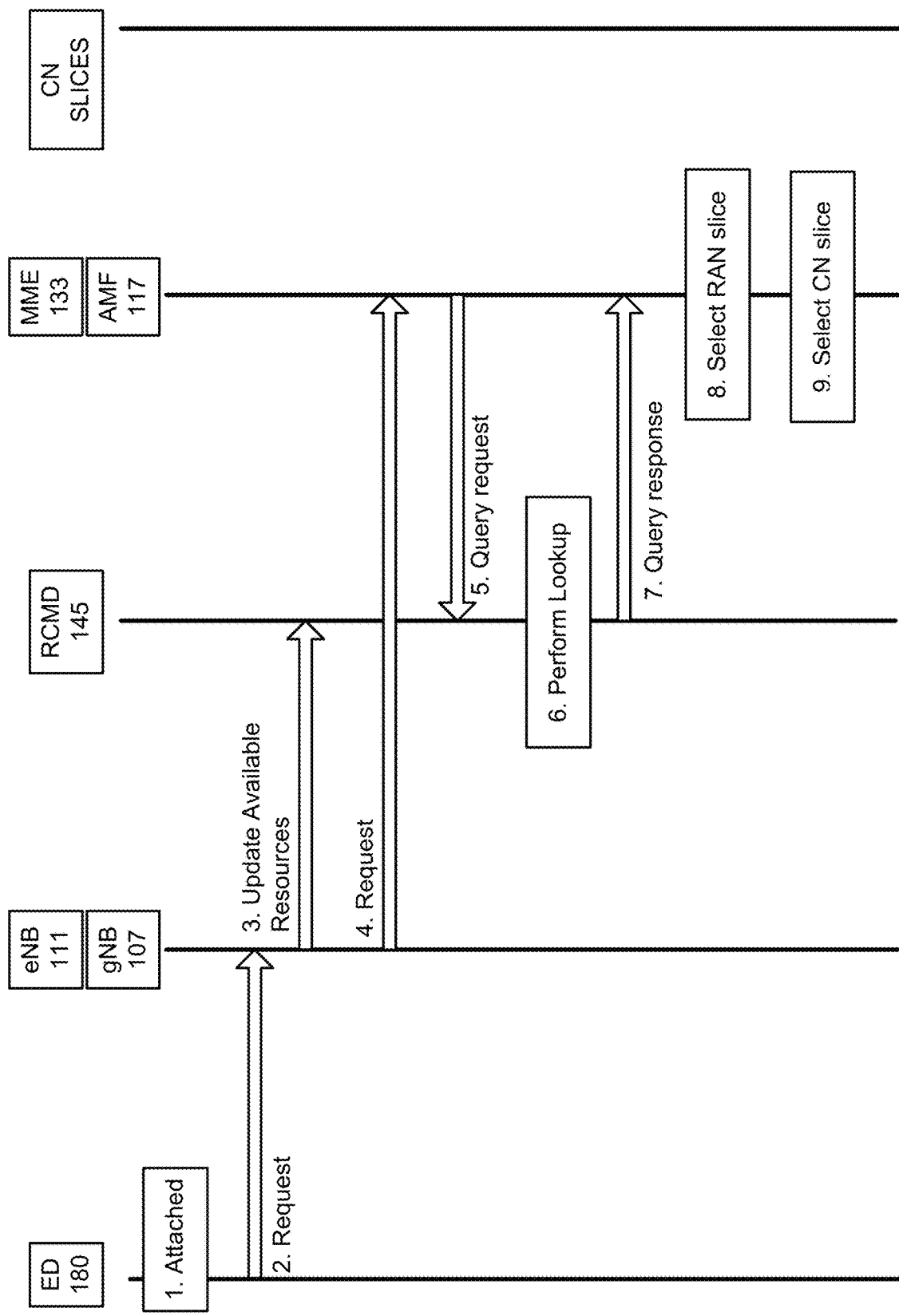
FIGS. 4A and 4B are diagrams illustrating exemplary processes of exemplary embodiments of the RAN-CN pairing service.

FIG. 4A is a diagram illustrating an exemplary process of the RAN-CN pairing service. For example, the process may be included in an establishment procedure. However, as previously described, according to other examples, the process may be included in other procedures (e.g., a bearer establishment procedure, a handover procedure, or other procedure that may occur subsequent to attachment of end device 180). The messages explained and illustrated are exemplary and may not represent each and every message that may be exchanged during a procedure. According to an exemplary implementation, a control plane of the network may be used to carry messages. According to other exemplary implementations, a future generation plane or dedicated plane of the network may be used.

Referring to FIG. 4A, in step (1), end device 180 may register and attach with core network 150 via access network 105. In step (2), end device 180 generates and transmits a request. For example, the request may be a service request or a slice request. The request may include information indicating a type of application and other information (e.g., end device identifier, etc.) that enables the RAN-CN pairing service to be provided. According to some exemplary implementations, the request may include information indicating a request to establish a bearer and/or a packet data unit (PDU) session. The request may be received by a RAN device (e.g., gNB 107 or eNB 111) via a radio connection between end device 180 and the RAN device.

According to an exemplary implementation, in step (3), in response to receiving the request, the RAN device may update RCMD 145 with available resource information. For example, as illustrated, the RAN device may generate and transmit an update message that includes available resource information. According to other exemplary implementations, step (3) may be omitted, occur responsive to another triggering event, or based on some other triggering mechanism.

In step (4), in response to receiving the request, the RAN device transmits the request to a CN device. For example, when the RAN device is gNB 107, gNB 107 may transmit the request to AMF 117, and when the RAN device is eNB 111, eNB 111 may transmit the request to MME 133.

In step (5), in response to receiving the request, the CN device (e.g., AMF 117 or MME 133) may generate and transmit a query request to RCMD 145. The query request may include location information and/or access network device information that may be correlated to location field 205 and/or access network device field 210. For example, the location information and/or the access network device information may pertain to the RAN device from which the request is received. The query request may include information indicating a type of application. In step (6), in response to receiving the query request, RCMD 145 may perform a look-up. For example, RCMD 145 may retrieve RAN-CN network slice pairing information (e.g., one or more records 250) based on the query request. In step (7), RCMD 145 may generate and transmit a query response that includes the RAN-CN network slice pairing information.

Figure 4B:
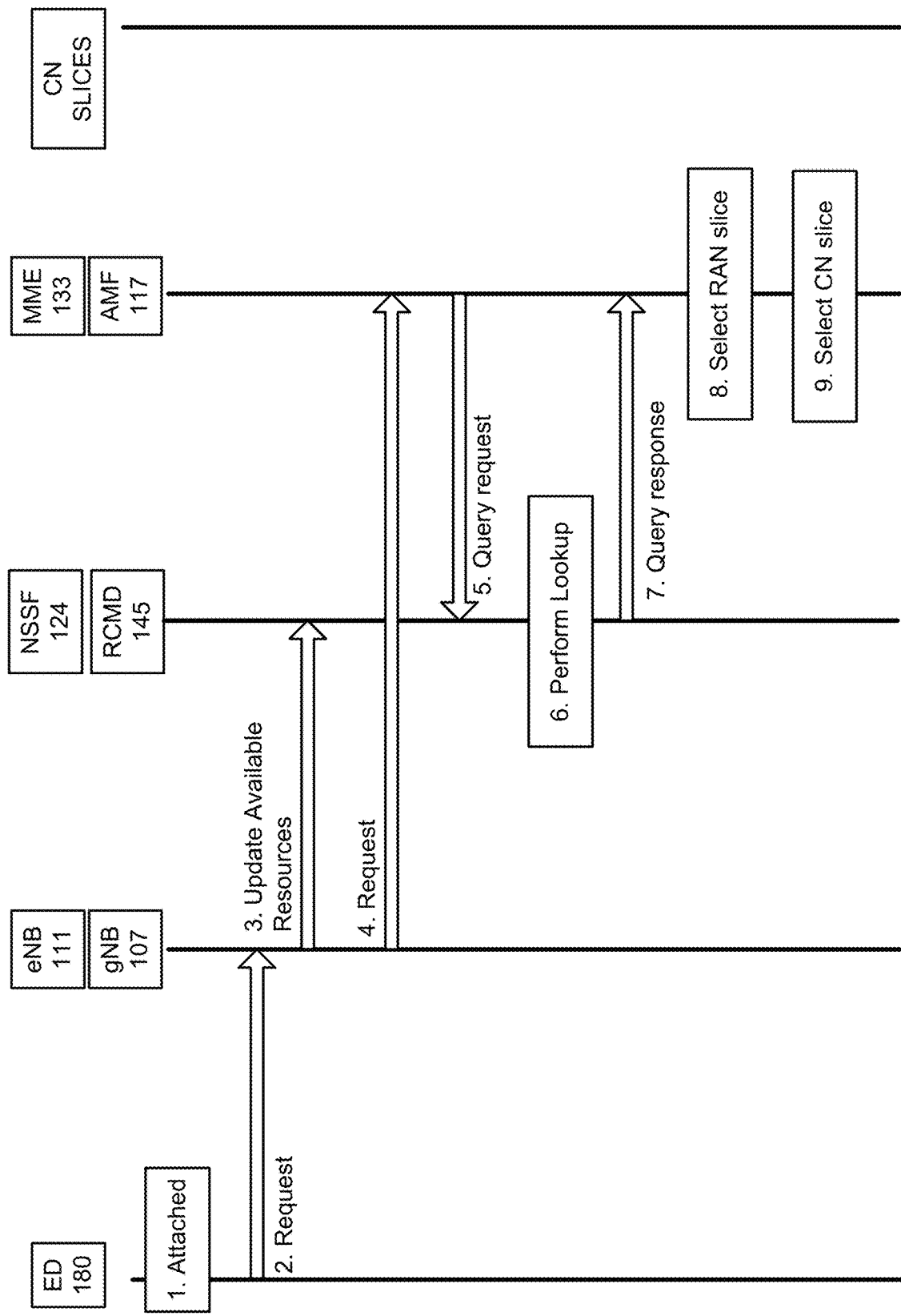

Referring to FIG. 4B, according to another embodiment, in step (5), in response to receiving the request, the CN device (e.g., AMF 117 or MME 133) may generate and transmit a query request to NSSF 124. According to an exemplary embodiment, NSSF 124 may include RCMD 145. According to another exemplary embodiment, NSSF 124 and RCMD 145 may be separate network devices. According to such an embodiment, NSSF 124 may generate and transmit the query request to RCMD 145. According to still other exemplary embodiments, in step (4), the request may be transmitted to NSSF 124, and in response, NSSF 124 may query RCMD 145 and obtain a result to the query. NSSF 124 may generate and transmit the query response to the CN device.

Figure 5A:
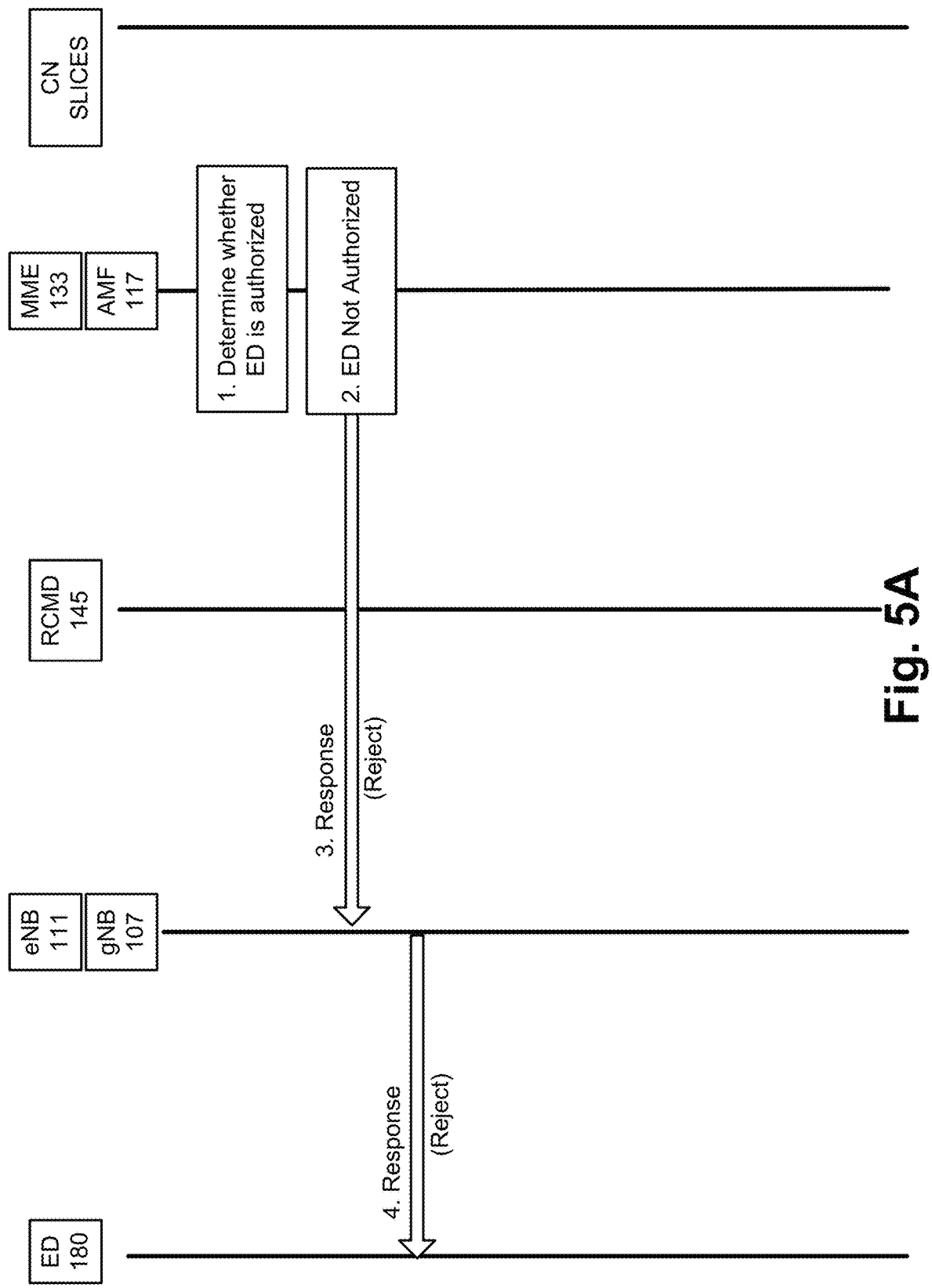

Referring back to FIG. 4A, in steps (8) and (9), the CN device may select a RAN slice, a CN slice, or both based on the RAN-CN network slice pairing information, as described herein. For example, referring to FIG. 5A, in step (1), the CN device may determine whether end device 180 is authorized. For example, the CN device may use subscription profile information pertaining to end device 180 to determine whether end device 180 is authorized or eligible to be provisioned a network slice and/or to be provisioned a network slice of a particular application type. The CN device may identify the type of application based on information included in the request. According to various exemplary implementations, the CN device may already store the subscription profile information (e.g., obtained during the attachment procedure) or may obtain the subscription profile information from, for example, UDM 121 or HSS 137 in response to receiving the request. According to various exemplary implementations, step (1) of FIG. 5A may be performed in response to receiving the request, as illustrated in step (4) of FIG. 4A but before the CN device queries RCMD 145. In this way, the CN device may ensure that end device 180 is authorized or eligible before obtaining RAN-CN network slice pairing information from RCMD 145. When the CN device determines that end device 180 is not authorized, in step (2) of FIG. 5A, the CN device may generate and transmit a response to the RAN device, in step (3) of FIG. 5A. In step (4) of FIG. 5A, the RAN device may transmit the response to end device 180. The response may include data indicating that the request is rejected. The response may also include data indicating the reason for the rejection (e.g., unauthorized, not permitted per subscription, etc.).

Figure 5B:
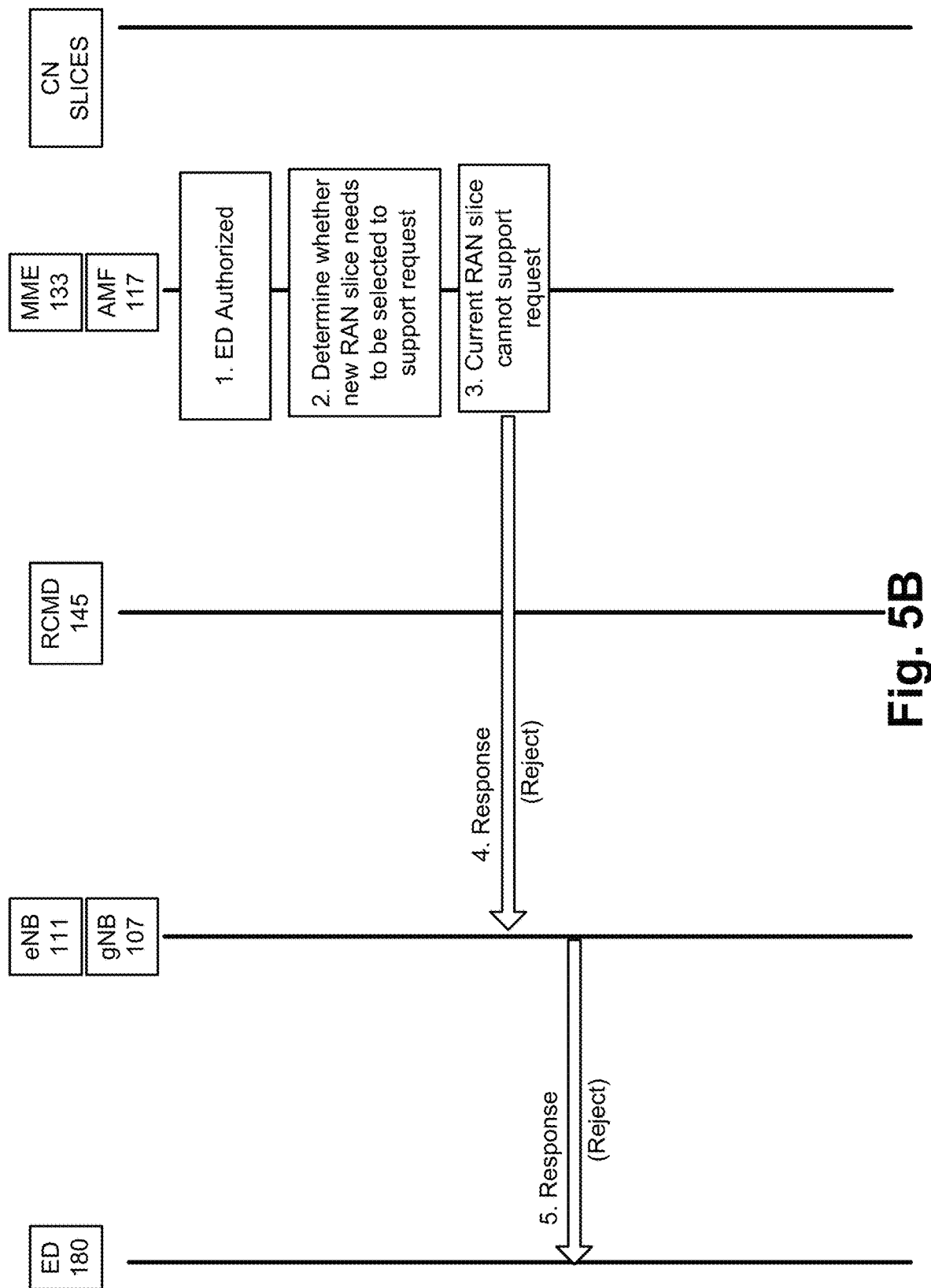

However, referring to FIG. 5B, in step (1), when the CN device determines that end device 180 is authorized, the CN device may determine whether a new RAN slice needs to be selected to support the request, in step (2) of FIG. 5B. For example, the CN device may compare the available resources of the current RAN slice to the application/service resources using the RAN-CN network slice pairing information obtained from RCMD 145. According to some exemplary embodiments, the current RAN slice may correspond to a RAN device currently used by or attached to end device 180. Depending on the multimode capabilities of end device 180, the current RAN slice may include multiple RAN slices (e.g., eNBs 111, gNBs 107). According to other exemplary embodiments, the current RAN slice may correspond to the RAN slice from which the request is received. In either case, by way of further example, the CN device may compare a parameter and a parameter value included in field 215 to a parameter and a parameter value included in field 220. The CN device may select the appropriate parameter and parameter value included in field 215 based on the identification of the type of application or service requested by end device 180.

As previously described, the CN device may consider other factors, such as the type of end device 180, the category of end device 180, the RAT type, or other characteristics of the application, service, or session, end device 180, the destination device, and/or the RAN device.

Based on a result of the comparison, the CN device may determine whether the current RAN slice may be used to support the request or a new RAN slice is to be selected. For example, the current RAN slice may not support the type of application or service requested or the current RAN slice may not have sufficient available resources to support the type of application or service requested. When the CN device determines that the current RAN slice may not be used to support the request, in step (3) of FIG. 5B, the CN device may generate and transmit a response to the RAN device, in step (4) of FIG. 5B. In step (5) of FIG. 5B, the RAN device may transmit the response to end device 180. The response may include data indicating that the request is rejected. The response may indicate the reason for the rejection (e.g., current eNB/gNB does not support type of application or service, current eNB/gNB has insufficient resources, etc.).

Although not illustrated, the response may invoke a cell reselection procedure at end device 180. According to an exemplary implementation, when a RAN slice of the locale does support the type of application or service requested (or a RAN slice of a neighboring locale), but end device 180 is not currently attached to the RAN slice, the CN device may provide this information to end device 180. For example, the response may include this information or a separate message may be sent. The information may include a frequency band, a channel number, and/or a network identifier pertaining to the RAN slice, which may be used to assist end device 180 during the cell reselection procedure and subsequent request for a network slice.

Referring to FIG. 5C, in step (1), when the CN device determines that a RAN slice, to which end device 180 is attached, may be used to support the request, the CN device may determine whether the current CN slice or a new CN slice is to be paired based on the RAN-CN network slice pairing information, as illustrated in step (2) of FIG. 5C. For example, the CN device may use context information pertaining to end device 180 to determine whether the current CN slice supports the request. By way of further example, the context information may include a CN slice identifier. According to various exemplary implementations, the CN slice identifier may identify a single CN slice or multiple CN slices. The CN device may determine whether the current CN slice is configured to support the request. For example, the CN device may use the RAN-CN network slice pairing information. According to some exemplary implementations, the CN device may also determine whether the current RAN slice can be paired with the CN slice when it is determined that the current CN slice supports the request. According to other exemplary implementations, such a determination may be omitted.

Referring to FIG. 5C, in step (2), for example, when the CN device determines that a new CN slice is to be selected, in step (3), the CN device selects a new CN slice that supports the request. In step (4), the CN device may generate and transmit a request and/or other appropriate message to establish a bearer between the current RAN slice and the new CN slice. According to various exemplary scenarios, the new CN slice may or may not include the CN device in combination with other network devices (e.g., SGW 131, PGW 135, UPF 115, etc.). According to various exemplary scenarios, the RAN-CN pairing service may or may not result in end device 180 attached to multiple CN devices (e.g., AMFs 117, MMES 133, etc.). Subsequent to the establishment of the bearer, although not illustrated, end device 180 may communicate with the destination device.

Figure 5D:
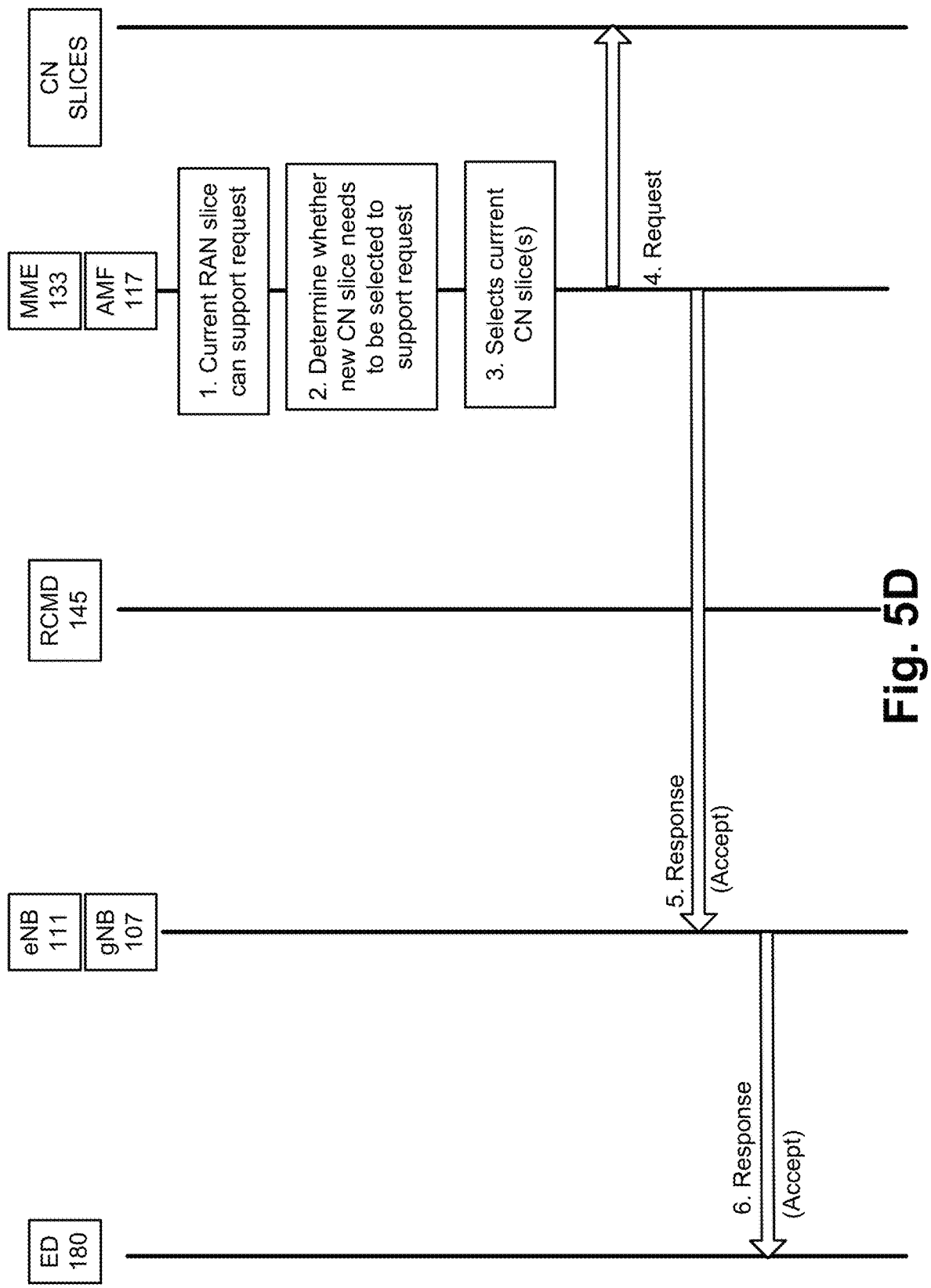

FIG. 5D illustrates steps similar to those depicted in FIG. 5C except, the CN device may determine that the current CN slice may support the request. For example, as illustrated in step (3), the CN device selects the current CN slice to support the request. According to various exemplary scenarios, depending on whether a current bearer between the RAN slice and the current CN slice is being used by end device 180, whether a current bearer between the RAN slice and the current CN slice supports the request, whether a current bearer has been established during the attachment procedure, etc., the CN device may or may not initiate a procedure to establish a bearer. According to an exemplary scenario, in step (4) of FIG. 5D, when the current bearer does not support the request, the CN device may generate and transmit a request or other appropriate message to establish a bearer. According to another exemplary scenario, when the current bearer has already been established and can support the request, in step (5), the CN device may generate and transmit a response or other appropriate message that is responsive to the request. For example, the message may indicate that the bearer is established and/or other information that indicates to end device 180 that end device 180 may proceed with a session. Subsequent to the establishment of the bearer or use of the current bearer, although not illustrated, end device 180 may communicate with the destination device via the selected RAN and CN slices.

Although FIGS. 4 and 5A-5D illustrate exemplary processes of the RAN-CN pairing service, according to other exemplary embodiments, the processes may include additional, different, and/or fewer steps, include additional, different, and/or fewer messages, and/or involve additional, different, and/or fewer network devices. For example, according to other exemplary embodiments, the processes illustrated and described in relation to FIGS. 5A-5D may be partially or wholly performed by NSSF 124.

As previously described, according to various exemplary embodiments, the RAN-CN pairing service may be included in other procedures. For example, the RAN-CN pairing service may be invoked during a handover procedure, such as between RAN devices (e.g., inter-cell), intra-cell within a same RAN device (e.g., between different sectors of an eNB, etc.), between CN devices (e.g., between AMFs, between SGWs, between MMES, etc.), between different RATs (e.g., LTE and 5G, etc.), and so forth. According to an exemplary embodiment, the handover procedure may be network-side controlled in view of the RAN-CN pairing service.

According to some exemplary embodiments, the RAN-CN pairing service may be included in a handover procedure in which a RAN device may determine whether a target RAN slice can support an existing application session. According to other exemplary embodiments, the RAN-CN pairing service may be included in a handover procedure in which a CN device may determine whether a target RAN slice can support an existing application session.

Figure 6B:
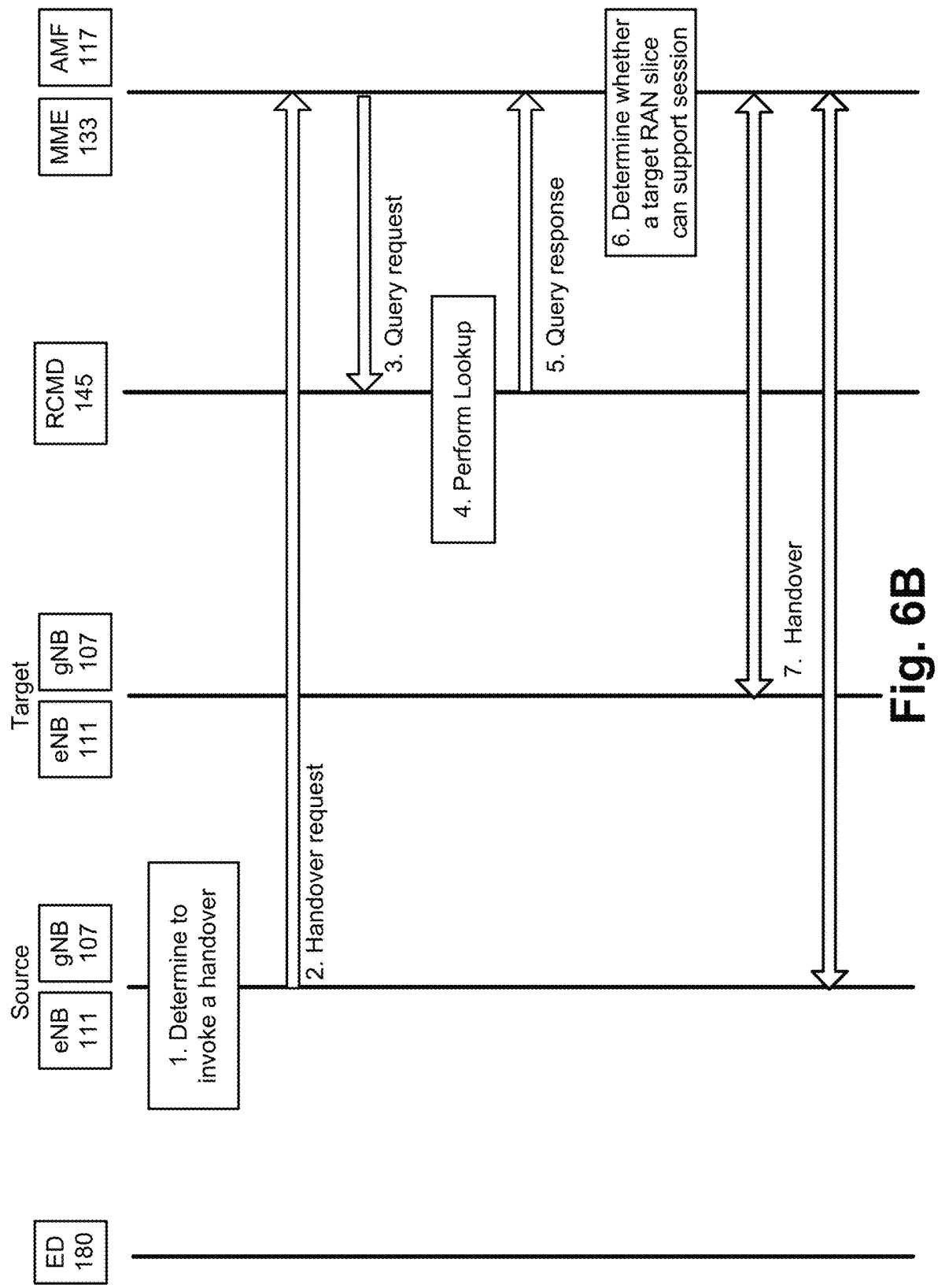

FIGS. 6A-6C are diagrams illustrating exemplary handover processes that include the RAN-CN pairing service. The messages explained and illustrated are exemplary and may not represent each and every message that may be exchanged. According to an exemplary implementation, a control plane of the network may be used to carry messaging. According to other exemplary implementations, a future generation plane or dedicated plane of the network may be used. According to these examples, it may be assumed that the CN slices remain the same for the handover. Further, according to these examples, it may be assumed that the RAT remains the same.

According to an exemplary embodiment, referring to FIG. 6A, in step (1), the RAN device (e.g., source gNB 107 or source eNB 111) may determine to invoke a handover procedure. For example, although not illustrated, the RAN device may receive a measurement report from end device 180. The RAN device may determine whether to invoke the handover procedure, which includes the RAN-CN pairing service, based on the measurement report and logic that governs handover. For example, the RAN device may determine whether an active application session is occurring between end device 180 and a destination device. According to an exemplary implementation, the RAN device may not invoke the handover procedure, which includes the RAN-CN pairing service, when end device 180 does not have a bearer established or there is not an active application session. That is, the RAN device may invoke a handover procedure that does not include the RAN-CN pairing service. According to other exemplary implementations, this may not be the case.

In step (2), in response to the determination to invoke the handover procedure, the RAN device may generate and transmit a query request to RCMD 145. The query request may include location information and/or access network device information that may be correlated to location field 205 and/or access network device field 210. The query request may include information indicating a type of application or service. In step (3), in response to receiving the query request, RCMD 145 may perform a look-up. For example, RCMD 145 may retrieve RAN-CN network slice pairing information (e.g., one or more records 250) based on the query request. In step (4), RCMD 145 may generate and transmit a query response that includes the RAN-CN network slice pairing information.

In step (5), the RAN device may select a target RAN slice (e.g., target gNB 107 or target eNB 111) based on the RAN-CN network slice pairing information, as described herein. For example, the RAN device may determine whether the target RAN slice supports the type of application or service and/or that the target RAN slice has sufficient available resources to support the type of application or service. According to various exemplary implementations, the determination to select the target RAN slice may or may not include messages exchanged between RAN devices (e.g., handover request, handover response), as illustrated in step (6). During or subsequent to the selection of the target RAN slice, as illustrated in step (6), the handover procedure may include messages exchanged between various network devices to execute the handover. As previously described, the handover procedure may include messages exchanged that are not illustrated (e.g., between end device 180 and the target RAN device, between the source RAN device and the CN device, etc.) and described.

According to another exemplary embodiment, referring to FIG. 6B, in step (1), the RAN device (e.g., source gNB 107 or source eNB 111) may determine to invoke a handover procedure. The RAN device may determine to invoke a handover procedure, which includes the RAN-CN pairing service, based on the measurement report and logic that governs handover. In step (2), in response to the determination to invoke the handover procedure, the RAN device may generate and transmit a handover request to a CN device (e.g., AMF 117 or MME 133). In response to receiving the handover request, the CN device may generate and transmit a query request to RCMD 145. The query request may include location information and/or access network device information that may be correlated to location field 205 and/or access network device field 210. The query request may include information indicating a type of application or service. In step (4), in response to receiving the query request, RCMD 145 may perform a look-up. For example, RCMD 145 may retrieve RAN-CN network slice pairing information (e.g., one or more records 250) based on the query request. In step (5), RCMD 145 may generate and transmit a query response, which includes the RAN-CN network slice pairing information, to the CN device.

Referring to FIG. 6C, according to another exemplary embodiment, in step (3), in response to receiving the handover request, the CN device (e.g., AMF 117 or MME 133) may generate and transmit a query request to NSSF 124. According to an exemplary embodiment, NSSF 124 may include RCMD 145. According to another exemplary embodiment, NSSF 124 and RCMD 145 may be separate network devices. According to such an embodiment, NSSF 124 may generate and transmit the query request to RCMD 145. According to still other exemplary embodiments, in step (2), the handover request may be transmitted to NSSF 124, and in response, NSSF 124 may query RCMD 145 and obtain a result to the query. NSSF 124 may generate and transmit the query response to the CN device.

Referring back to FIG. 5B, in step (6), the CN device may select a target RAN slice (e.g., target gNB 107 or target eNB 111) based on the RAN-CN network slice pairing information, as described herein. For example, the CN device may determine whether the target RAN slice supports the type of application or service and/or that the target RAN slice has sufficient available resources to support the type of application or service. The CN device may identify the type of current application/service based on context information pertaining to end device 180. According to various exemplary implementations, the determination to select the target RAN slice may or may not include messages exchanged between the CN device and the RAN device (e.g., the source RAN device, the target RAN device, or both). During or subsequent to the selection of the target RAN slice, as illustrated in step (7), the handover procedure may include messages exchanged between various network devices to execute the handover. As previously described, the handover procedure may include messages exchanged that are not illustrated.

Although FIGS. 6A-6C illustrate exemplary processes of the RAN-CN pairing service, according to other exemplary embodiments, the processes may include additional, different, and/or fewer steps, include additional, different, and/or fewer messages, and/or involve additional, different, and/or fewer network devices. For example, according to other exemplary embodiments, referring to FIG. 6C, NSSF 124 may perform step (6) and/or step (7).

According to other exemplary embodiments, the RAN-CN pairing service may be included when the handover procedure involves changing a CN device (e.g., AMF 117, MME 133, SGW 131, etc.). For example, when the CN device is an AMF 117 or MME 133, the CN device may select the target CN slice (e.g., AMF 117 or MME 133) and the target CN slice may select the target RAN slice and/or another target CN slice (e.g., SGW 131, UPF 115, etc.). Additionally, when the handover procedure involves an inter-RAT handover, the target CN slice may select the target RAN slice and target CN slice.

FIG. 7 is a diagram illustrating exemplary components of a device 700 that may be included in one or more of the devices described herein. For example, device 700 may correspond to components included in network devices of access network 105, network devices in core network 150, and end device 180. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to network devices of access network 105 and core network 150, software 720 may include an application that, when executed by processor 710, provides the functions of the RAN-CN pairing service, as described herein. Software 720 may also include firmware, middleware, microcode, hardware description language (HDL), and/or other form of instruction. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, application programming interface (API), etc.). Communication interface 725 may be implemented as a point-to-point interface, a service based interface, etc.

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
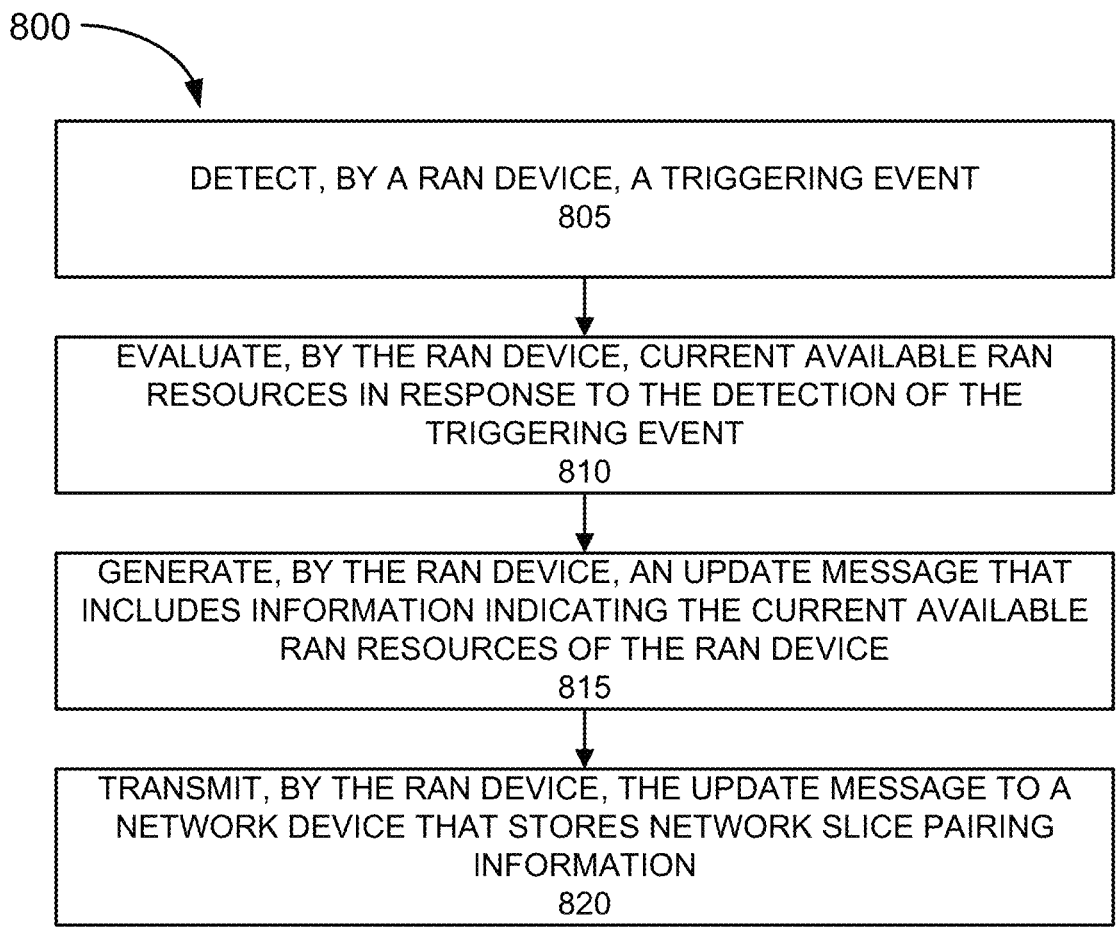
FIG. 8 is a flow diagram illustrating an exemplary updating process of an exemplary embodiment of the RAN-CN pairing service.

FIG. 8 is a flow diagram illustrating an exemplary process 800 of an exemplary embodiment of the RAN-CN pairing service. Process 800 is directed to a process previously described with respect to FIG. 3, as well as elsewhere in this description, in which the RAN-CN pairing service is provided. According to an exemplary embodiment, a RAN device (e.g., gNB 107, eNB 111, or other type of wireless device of an access network) performs steps of process 800. For example, processor 710 executes software 720 to perform the steps illustrated in FIG. 8, and described herein.

Referring to FIG. 8, in block 805, a RAN device may detect a triggering event. For example, the RAN device may detect the receipt or the transmission of a message associated with a network procedure (e.g., an attachment procedure, a handover procedure, a bearer establishment procedure, or other procedure subsequent to attachment of an end device), as previously described. According to other examples, the RAN device may detect the triggering event based on a timer mechanism or other configurable mechanism, as previously described.

In block 810, the RAN device may evaluate current available RAN resources in response to the detection of the triggering event. For example, as previously described, the current available RAN resources may include radio resources, the number of available connections, and available physical, virtual, and/or logical resources.

In block 815, the RAN device may generate an update message that includes information indicating the current available RAN resources of the RAN device. In block 820, the RAN device may transmit the update message to a network device that stores RAN-CN network slice pairing information. For example, the RAN device may transmit the update message to RCMD 145.

Although FIG. 8 illustrates an exemplary process 800 of the RAN-CN pairing service, according to other embodiments, process 800 may include additional operations, fewer operations, and/or different operations than those illustrated in FIG. 8, and described herein.

Figure 9A:
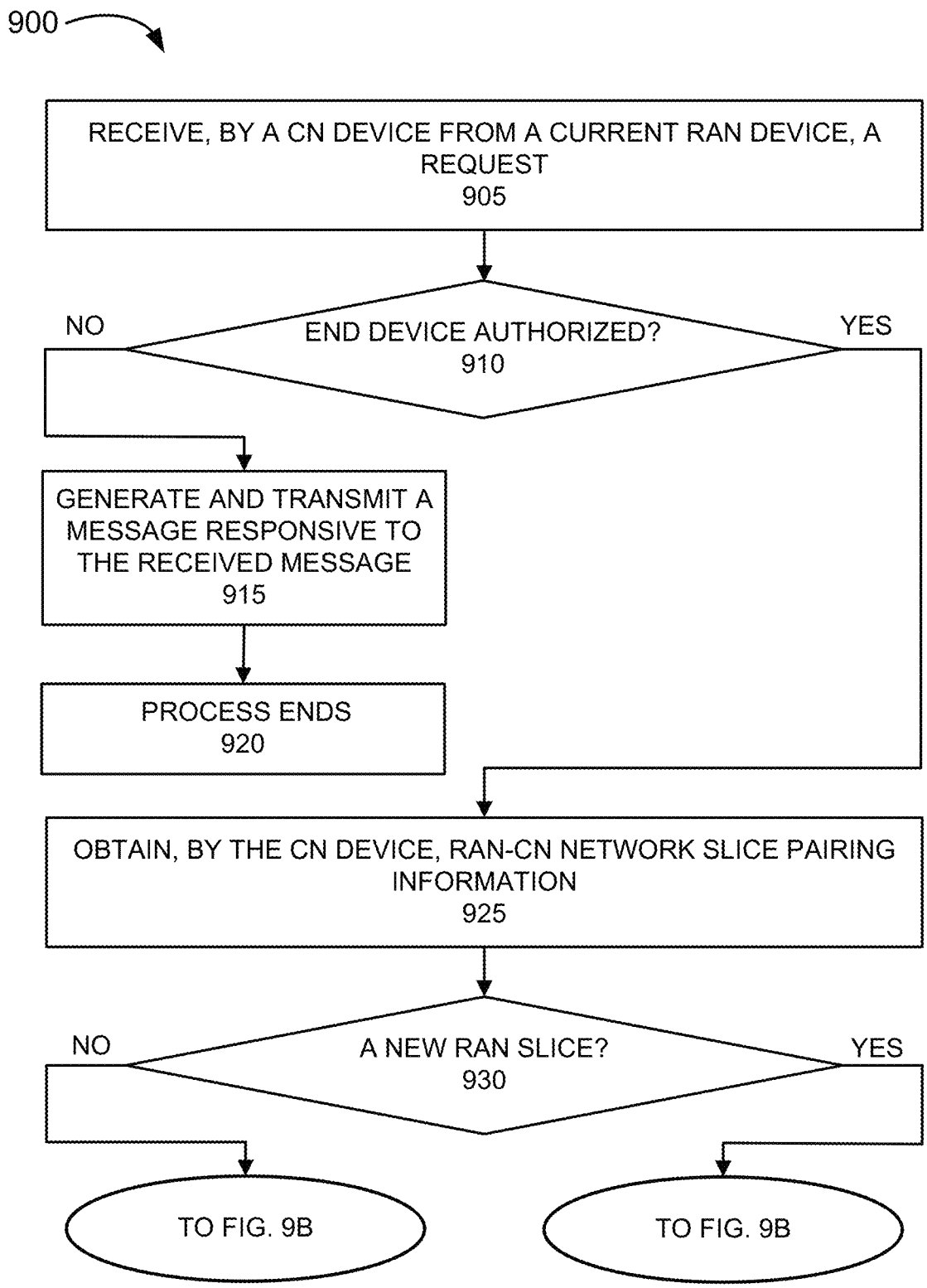
FIGS. 9A and 9B are flow diagrams illustrating another exemplary process of an exemplary embodiment of the RAN-CN pairing service.
Figure 9B:
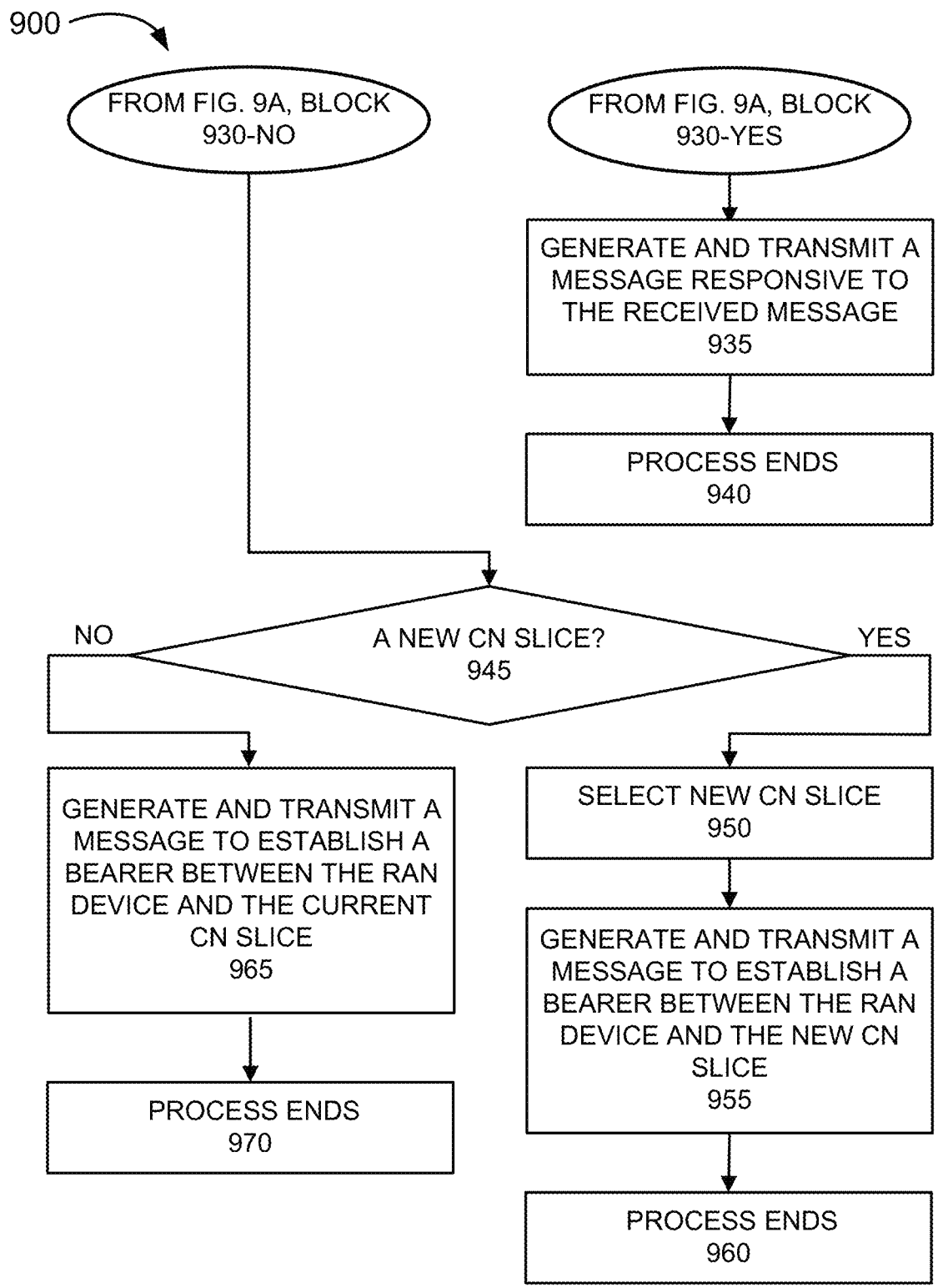

FIGS. 9A and 9B are flow diagrams illustrating an exemplary process 900 of an exemplary embodiment of the RAN-CN pairing service. Process 900 is directed to a process previously described with respect to FIGS. 4A, 4B, and 5A-5D, as well as elsewhere in this description, in which the RAN-CN pairing service is included in an establishment procedure. According to an exemplary embodiment, a CN device (e.g., AMF 117, MME 133, or other type of network device of a core network (e.g., NSSF 124)) performs steps of process 900. For example, processor 710 executes software 720 to perform the steps illustrated in FIGS. 9A and 9B, and described herein.

Referring to FIG. 9A, in block 905, a CN device may receive, from a RAN device, a request. For example, the CN may receive a service request or a slice request pertaining to end device 180. As previously described, the request may indicate a type of application or service and other information.

In block 910, it may be determined whether the end device is authorized. For example, as previously described, the CN device may determine whether end device 180 is authorized based on subscription profile information pertaining to end device 180.

When it is determined that the end device is not authorized (block 910—NO), the CN device may generate and transmit a message responsive to the received message (block 915). For example, as previously described, the CN device may generate a response indicating that the request is rejected. In block 920, process 900 may end.

When it is determined that the end device is authorized (block 910—YES), the CN device may obtain RAN-CN network slice pairing information (block 925). For example, as previously described, the CN device may generate and transmit a query request to RCMD 145. The query request may include location and/or access network device information, as previously described. RCMD 145 may perform a look-up based on the query request, and the CN device may receive a query response, which includes the RAN-CN network slice pairing information, from RCMD 145.

In block 930, it may be determined whether a new RAN slice is to be selected. For example, as previously described, the CN device may use the RAN-CN network slice pairing information. By way of further example, the CN device may evaluate the current available RAN resources associated with the RAN device, the resources need to support the type of application or service associated with the request, and so forth.

Referring to FIG. 9B, when it is determined that a new RAN slice is to be selected (block 930—YES), the CN device may generate and transmit a message responsive to the received message (block 935). For example, the CN device may generate and transmit a response to end device 180 via the RAN device. The response may indicate the current RAN device does not support the request and/or cell reselection information, as previously described. In block 940, process 900 may end.

When it is determined that a new RAN slice is not to be selected (block 930—NO), the CN device may determine whether a new CN slice is to be selected (block 945). For example, as previously described, the CN device may use context information pertaining to a current CN slice (e.g., CN slice identifier, etc.) and the RAN-CN network slice pairing information to determine whether the current CN slice can support the type of application or service associated with the request.

When it is determined that a new CN slice is to be selected (block 945—YES), the CN device selects the new CN slice (block 950). For example, as previously described, the CN device selects the new CN slice that supports the type of application or service based on the RAN-CN network slice pairing information. In block 955, the CN device may generate and transmit a message to establish a bearer between the RAN device and the new CN slice. In block 960, process 900 may end.

When it is determined that a new CN slice is not to be selected (block 945—NO), the CN device may generate and transmit a message to establish a bearer between the RAN device and the current CN slice (block 965). For example, as previously described, the CN device may determine that a current bearer does not support the type of application or service requested. In block 970, the process may end.

Although FIGS. 9A and 9B illustrate an exemplary process 900 of the RAN-CN pairing service, according to other embodiments, process 900 may include additional operations, fewer operations, and/or different operations than those illustrated in FIGS. 9A and 9B, and described herein. Additionally, the messages described are exemplary.

Figure 10:
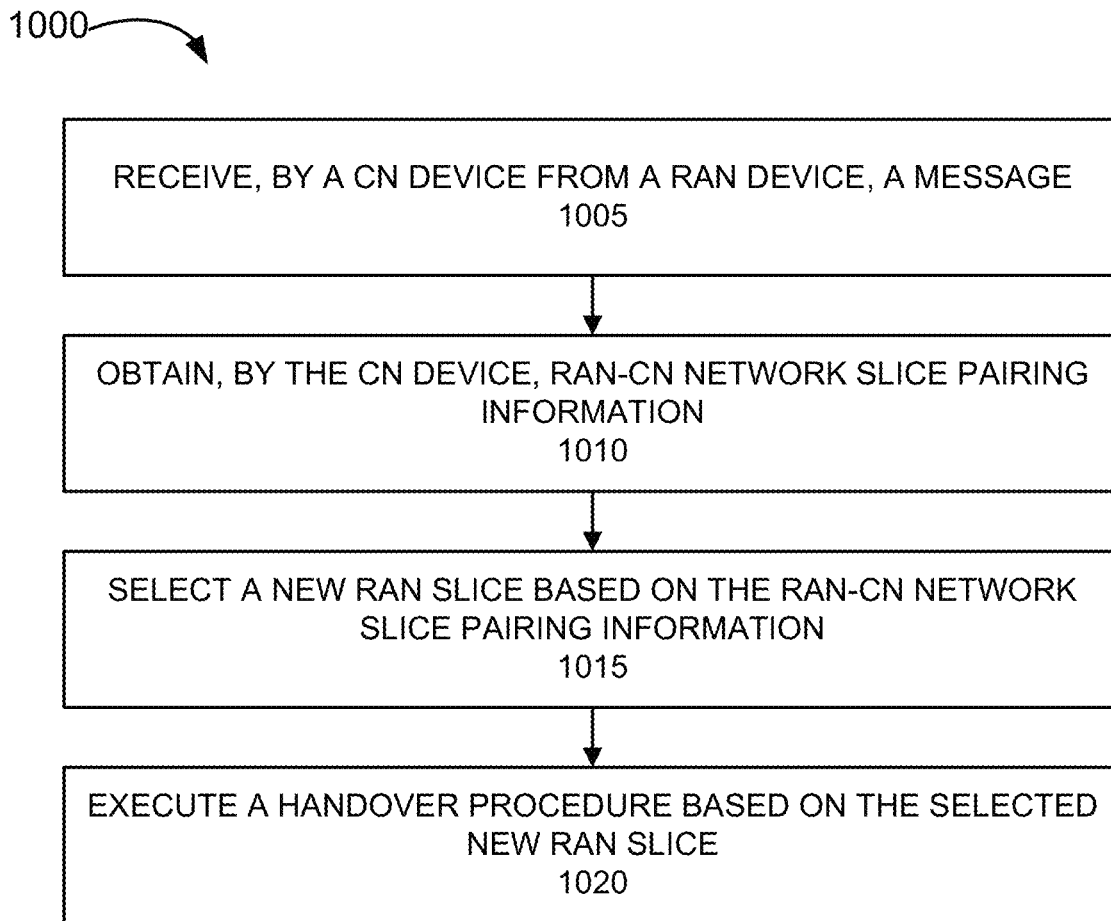
FIG. 10 is a flow diagram illustrating yet another exemplary process of an exemplary embodiment of the RAN-CN pairing service.

FIG. 10 is a flow diagram illustrating an exemplary process 1000 of an exemplary embodiment of the RAN-CN pairing service. Process 1000 is directed to a process previously described with respect to FIGS. 6B and 6C, as well as elsewhere in this description, in which the RAN-CN pairing service is included in a handover procedure. According to an exemplary embodiment, a CN device (e.g., AMF 117, MME 133, NSSF 124) performs steps of process 1000. For example, processor 710 executes software 720 to perform the steps illustrated in FIG. 10, and described herein.

Referring to FIG. 10, in block 1005, a CN device may receive, from a RAN device, a message. For example, the CN may receive a handover request to establish a handover between end device 180 and a target RAN device. It may be assumed that end device 180 has an active session associated with a type of application or service and a destination device (e.g., in network 155)

In block 1010, the CN device may obtain RAN-CN network slice pairing information. For example, as previously described, the CN device may generate and transmit a query request to RCMD 145. The query request may include location and/or access network device information, as previously described. RCMD 145 may perform a look-up based on the query request, and the CN device may receive a query response, which includes the RAN-CN network slice pairing information, from RCMD 145.

In block 1015, the CN device may select a new RAN slice based on the RAN-CN network slice pairing information. For example, as previously described, the CN device may select the new RAN slice based on the available RAN resources of candidate target RAN slices and the threshold resources information that supports the type of application or service associated with the active session.

In block 1020, the CN device may execute a handover procedure based on the selected new RAN slice. For example, the CN device may communicate with the selected target RAN slice, the source RAN slice, etc., to execute the handover procedure based on the RAN-CN pairing service.

Although FIG. 10 illustrates an exemplary process 1000 of the RAN-CN pairing service, according to other embodiments, process 1000 may include additional operations, fewer operations, and/or different operations than those illustrated in FIG. 10, and described herein. Additionally, the messages described are exemplary. Additionally, as previously described, according to other exemplary embodiments, a source RAN device may perform a handover procedure, which includes the RAN-CN pairing service.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIGS. 8, 9A, 9B, and 10, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a device. A non-transitory storage medium includes one or more of the storage mediums described in relation to memory/storage 715.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device, a request for service from an end device;
   obtaining, by the network device, network slice pairing information that correlates radio access network (RAN) slices of an access network with core network slices of a core network based on location information pertaining to the RAN slices, radio access technology (RAT) type pertaining to the RAN slices, available resources of the RAN slices, and different types of applications and services correlated to the core network slices; and
   determining, by the network device, that a first RAN slice can support the request based on the obtained network slice pairing information, a type of application or service pertaining to the request, and location and RAT type information pertaining to the first RAN slice.

2. The method of claim 1, further comprising:
   selecting, by the network device, a first core network slice of the core network slices based on the network slice pairing information and the type of application or service pertaining to the request.

3. The method of claim 2, further comprising:
   determining, by the network device, whether the first core network slice of the core network to which the end device is connected, can support the request based on the network slice pairing information;
   selecting, by the network device in response to determining that the first core network slice cannot support the request, a second core network slice of the core network that can support the request based on the network slice pairing information; and
   transmitting, by the network device, a message that initiates an establishment of a connection between the end device and the second core network slice.

4. The method of claim 2, further comprising:
   transmitting, by the network device to the end device in response to selecting the first core network slice, a message that indicates to proceed with the request.

5. The method of claim 1, wherein the network slice pairing information includes threshold resource information pertaining to the different types of applications and services.

6. The method of claim 1, further comprising:
   receiving, by the network device subsequent to an establishment of a session between the end device and a destination network device of a first network, a handover request from the first RAN slice pertaining to the end device;
   obtaining, by the network device, in response to receiving the handover request, the network slice pairing information; and
   selecting, by the network device, a second RAN slice to be included in a handover based on the network slice pairing information pertaining to the second RAN slice.

7. The method of claim 6, wherein the selecting of the second RAN slice comprises:
   determining, by the network device, whether the second RAN slice has sufficient available resources to support the type of application or service pertaining to the session; and selecting, by the network device in response to determining that the second RAN slice has sufficient available resources, the second RAN slice to be included in the handover.

8. The method of claim 1, further comprising:
determining, by the network device in response to the receiving, whether the end device is authorized to make the request; and
determining, by the network device based on subscription information of the end device, that the end device is authorized.

9. A network device comprising:
a processor configured to:
receive a request for service from an end device;
obtain network slice pairing information that correlates radio access network (RAN) slices of an access network with core network slices of a core network based on location information pertaining to the RAN slices, radio access technology (RAT) type pertaining to the RAN slices, available resources of the RAN slices, and different types of applications and services correlated to the core network slices; and
determine that a first RAN slice can support the request based on the obtained network slice pairing information, a type of application or service pertaining to the request, and location and RAT type information pertaining to the first RAN slice.

10. The network device of claim 9, wherein the processor is further configured to:
select a first core network slice of the core network slices based on the network slice pairing information and the type of application or service pertaining to the request.

11. The network device of claim 10, wherein the processor is further configured to:
determine whether the first core network slice of the core network to which the end device is connected, can support the request based on the network slice pairing information;
select, in response to a determination that the first core network slice cannot support the request, a second core network slice of the core network that can support the request based on the network slice pairing information; and
transmit a message that initiates an establishment of a connection between the end device and the second core network slice.

12. The network device of claim 10, wherein the processor is further configured to:
transmit, in response to the selection of the first core network slice to the end device, a message that indicates to proceed with the request.

13. The network device of claim 9, wherein the network slice pairing information includes threshold resource information pertaining to the different types of applications and services.

14. The network device of claim 9, wherein the processor is further configured to:
receive, subsequent to an establishment of a session between the end device and a destination network device of a first network, a handover request from the first RAN slice pertaining to the end device;
obtain, in response to the receipt of the handover request, the network slice pairing information; and
select a second RAN slice to be included in a handover based on the network slice pairing information pertaining to the second RAN slice.

15. The network device of claim 9, wherein the processor is further configured to:
determine, in response to receipt of the request, whether the end device is authorized to make the request; and
determine, based on subscription information of the end device, that the end device is authorized.

16. A non-transitory, computer-readable storage medium storing instructions executable by a processor of a device, which when executed cause the device to:
receive a request for service from an end device;
obtain from a first network device, network slice pairing information that correlates radio access network (RAN) slices of an access network with core network slices of a core network based on location information pertaining to the RAN slices, radio access technology (RAT) type pertaining to the RAN slices, available resources of the RAN slices, and different types of applications and services correlated to the core network slices; and
determine that a first RAN slice can support the request based on the obtained network slice pairing information, a type of application or service pertaining to the request, and location and RAT type information pertaining to the first RAN slice.

17. The non-transitory, computer-readable storage medium of claim 16, wherein the instructions further include instructions executable by the processor of the device, which when executed cause the device to:
select a first core network slice of the core network slices based on the network slice pairing information and the type of application or service pertaining to the request.

18. The non-transitory, computer-readable storage medium of claim 17, wherein the instructions further include instructions executable by the processor of the device, which when executed cause the device to:
determine whether the first core network slice of the core network to which the end device is connected, can support the request based on the network slice pairing information;
select, in response to a determination that the first core network slice cannot support the request, a second core network slice of the core network that can support the request based on the network slice pairing information; and
transmit a message that initiates an establishment of a connection between the end device and the second core network slice.

19. The non-transitory, computer-readable storage medium of claim 16, wherein the instructions further include instructions executable by the processor of the device, which when executed cause the device to:
receive, subsequent to an establishment of a session between the end device and a destination network device, a handover request from the first RAN slice pertaining to the end device;
obtain in response to the receipt of the handover request, the network slice pairing information; and
select a second RAN slice to be included in a handover based on the network slice pairing information pertaining to the second RAN slice.

20. The non-transitory, computer-readable storage medium of claim 16, wherein the network slice pairing information includes threshold resource information pertaining to the different types of applications and services.

* * * * *